(12) United States Patent
Washio

(10) Patent No.: US 8,761,536 B2
(45) Date of Patent: Jun. 24, 2014

(54) IMAGE PROCESSING APPARATUS AND IMAGE PROCESSING METHOD

(75) Inventor: Koji Washio, Hachioji (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 184 days.

(21) Appl. No.: 13/533,305

(22) Filed: Jun. 26, 2012

(65) Prior Publication Data

US 2013/0004098 A1 Jan. 3, 2013

(30) Foreign Application Priority Data

Jun. 29, 2011 (JP) ................................. 2011-143684

(51) Int. Cl.
*G06K 9/40* (2006.01)

(52) U.S. Cl.
USPC ............ 382/264; 382/266; 382/270; 358/448

(58) Field of Classification Search
USPC .......................... 382/264, 266, 270; 358/448
See application file for complete search history.

(56) References Cited

U.S. PATENT DOCUMENTS

| 6,775,031 | B1 * | 8/2004 | Fujiwara | ........................ 358/2.1 |
| 2003/0194147 | A1 * | 10/2003 | Yamazaki | ..................... 382/266 |
| 2008/0074699 | A1 * | 3/2008 | Washio | ........................ 358/2.99 |

FOREIGN PATENT DOCUMENTS

| JP | 07-334672 A | 12/1995 |
| JP | 4225337 B2 | 12/2008 |

* cited by examiner

*Primary Examiner* — Chan Park
*Assistant Examiner* — Eueng-Nan Yeh
(74) *Attorney, Agent, or Firm* — Holtz Holtz Goodman & Chick PC

(57) ABSTRACT

An image processing apparatus includes a thinning processing unit which performs thinning processing on image data and a smoothing processing unit which performs smoothing processing on the image data. The image processing apparatus further includes an edge direction determination unit which determines an edge direction with respect to each pixel of the image data, a blending processing unit which decides a pixel value of a target pixel of when the smoothing processing and the thinning processing are realized at the same time, and a thinning adjustment unit which determines whether a thinned pixel becomes isolated, and the thinning adjustment unit resets the change amount in pixel value due to the thinning processing of the thinned pixel to a value of zero, if the thinned pixel is determined to be isolated.

8 Claims, 20 Drawing Sheets

FIG.2

| 01 | 02 | 03 | 04 | 05 | 06 | 07 |
|----|----|----|----|----|----|----|
| 08 | 09 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |

M:dST(-), dSMT(-)           M:dST(+), dSMT(+)

- - - - - - LINE IMAGE OF EDGE AFTER SMOTTHING PROCESSING     - - - - - - LINE IMAGE OF EDGE AFTER SMOTTHING PROCESSING

·········· LINE IMAGE OF EDGE AFTER THINNING PROCESSING     ·········· LINE IMAGE OF EDGE AFTER THINNING PROCESSING

M:dST(-)
N:dSMT(+)

- - - - - LINE IMAGE OF EDGE
AFTER SMOTTHING PROCESSING
· · · · · · · LINE IMAGE OF EDGE
AFTER THINNING PROCESSING

M:dST(+)
N:dSMT(-)

- - - - - LINE IMAGE OF EDGE
AFTER SMOTTHING PROCESSING
· · · · · · · LINE IMAGE OF EDGE
AFTER THINNING PROCESSING

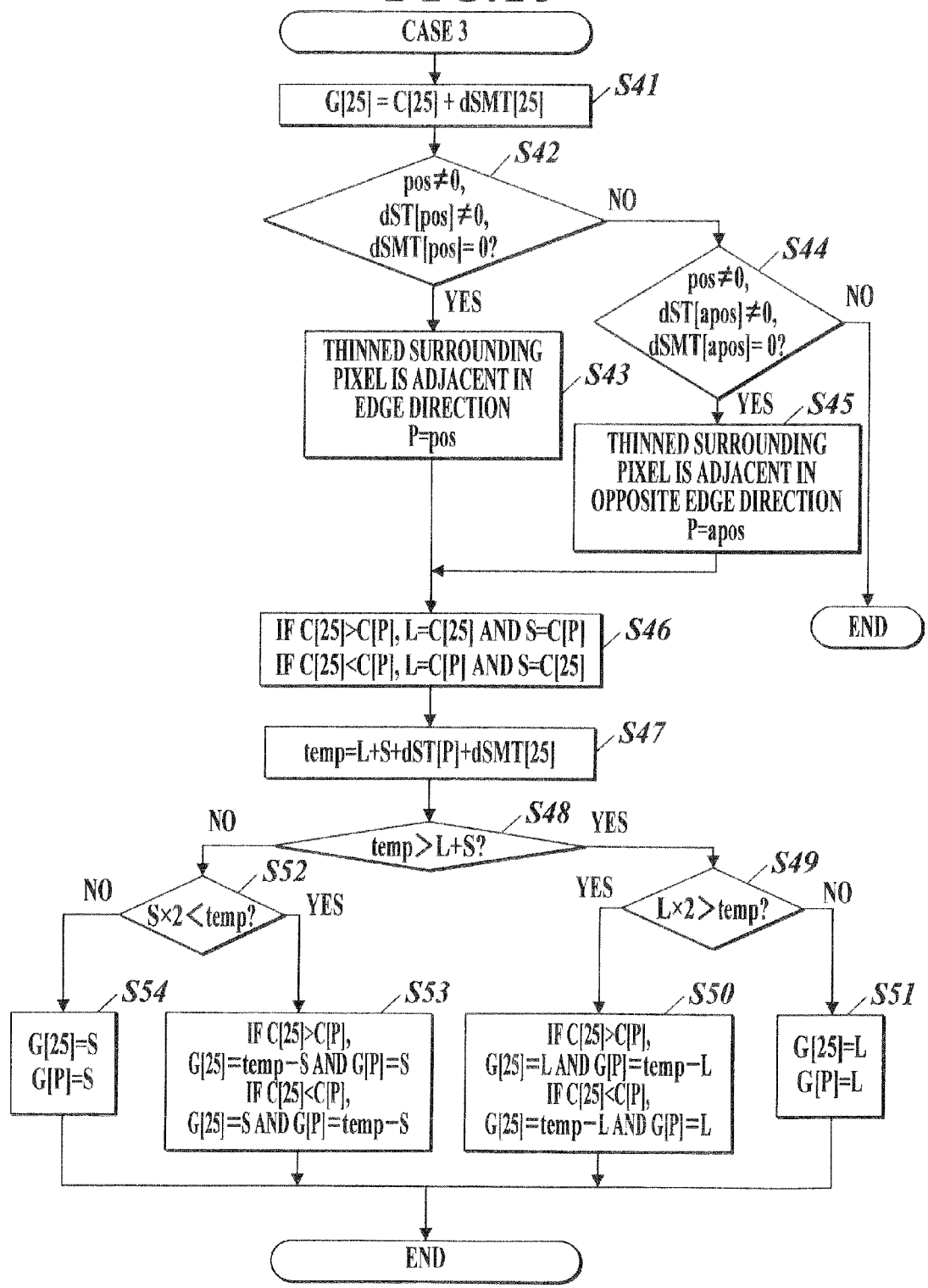

*FIG.16A*  *FIG.16B*
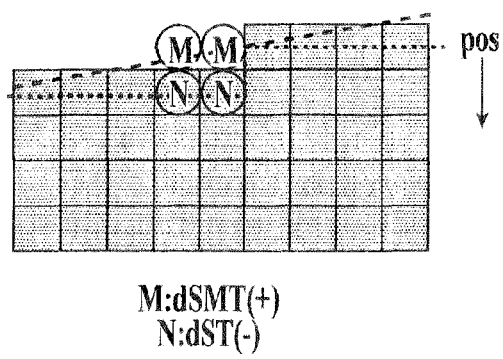
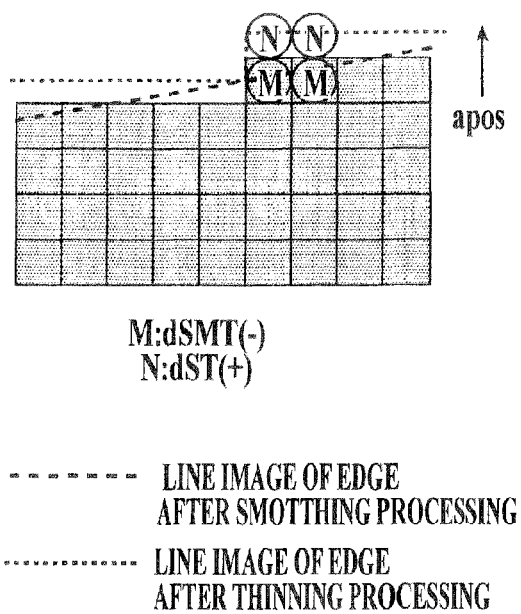
M:dSMT(+)
N:dST(-)
M:dSMT(-)
N:dST(+)
------- LINE IMAGE OF EDGE
AFTER SMOTTHING PROCESSING
·············· LINE IMAGE OF EDGE
AFTER THINNING PROCESSING
------- LINE IMAGE OF EDGE
AFTER SMOTTHING PROCESSING
·············· LINE IMAGE OF EDGE
AFTER THINNING PROCESSING N:dST(-), dSMT(-)

N:dST(+), dSMT(+)

------- LINE IMAGE OF EDGE AFTER SMOTTHING PROCESSING

·········· LINE IMAGE OF EDGE AFTER THINNING PROCESSING

------- LINE IMAGE OF EDGE AFTER SMOTTHING PROCESSING

·········· LINE IMAGE OF EDGE AFTER THINNING PROCESSING

ORIGINAL IMAGE

DESIRED IMAGE

SMOOTHING PROCESSING ONLY

THINNING PROCESSING ONLY

SWITCH BETWEEN SMOOTHING PROCESSING AND THINNING PROCESSING

SET PIXEL VALUE TO BE SMALLER IN SMOOOTHING PROCESSING

ORIGINAL IMAGE

SMOOTHING PROCESSING ONLY

THINNING PROCESSING ONLY

INVALIDATE THINNING

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of Related Art

Thinning processing is known as an image processing. In thinning processing, sharpness of a character and the like is improved by decreasing pixel values at the edges of the character and the like.

Smoothing processing is also an image processing to be performed on edges. In smoothing processing, edges of an oblique line portion can be visually smoothed by making the edges be halftone by increasing or decreasing pixel values at the edges of the oblique line portion of a character and the like.

Both of thinning processing and smoothing processing are performed on edges. However, it has been difficult to perform both processing at the same time because the objects of the two processing are different. For example, though a sharp and smooth character can be obtained when thinning processing is performed on straight line portions and smoothing processing is performed on oblique line portions of a character, it is difficult to obtain such a character by a method of detecting structures of the straight line portions and the oblique line portions and switching between thinning processing and smoothing processing depending on the detected structure (see Japanese Patent Application Laid Open Publication No. H7-334672, for example). This is because there is a pixel which belongs to both the straight line portion and the oblique line portion, causing an unexpected result such as increase in pixel value due to smoothing processing though thinning, not smoothing, should have been the appropriate processing.

In response to this, the applicant developed an image processing apparatus to realize thinning processing and smoothing processing at the same time (see Japanese Patent No 4225337, for example). In this image processing apparatus, results of smoothing processing and thinning processing are stored as change amounts from the original pixel value. When a pixel value obtained by adding the stored change amounts to the original pixel value exceeds the maximum value or becomes a negative value, the excess or shortfall is adjusted by using a pixel value of an adjacent pixel which has a predetermined positional relationship with the target pixel. By adjusting the processing results of thinning processing and smoothing processing not only in the target pixel but in two pixels which are the target pixel and an adjacent pixel thereof, the two processing results can be absorbed reasonably.

When thinning processing is performed on a thin line which originally has a thin line width, the thin line may blur or disappear because both sides of the thin line are thinned. For example, in a case of a thin line which has a two-pixel width, the thin line itself disappears when the pixel values are decreased in both sides by thinning. In order to prevent such disappearance of thin line structures, the thin line structures are conventionally determined and excluded from the targets of thinning when thinning processing is performed.

However, such exclusion of thin line structures may lead to an unintended result. For example, when lossy compression is performed on image data, the original image data is not necessarily completely restored by decompression, and image quality of the character and the like may be partially degraded. For example, the outline may not be restored to be a smooth line and may be sharp and thin instead. The sharpened portion is determined to be a thin line structure when thinning processing is performed, and thinning is invalidated only at the sharpened portion. Because one character includes both not-thinned portions and thinned portions, the line widths of the character become imbalanced.

In addition, a nearly-horizontal oblique line has a structure wherein long horizontal lines are aligned in a stepwise manner, and the stepped portions temporarily have a large line width. Therefore, a phenomenon where only the stepped portions are thinned though the horizontal line is not a target of thinning processing occurs. Whereas the not-thinned horizontal lines include a lot of pixels, the thinned stepped portions include at most one or two pixels, and thus the thinned portions become isolated. When thinning processing and smoothing processing are performed at the same time on an image including such isolated thinned portions, the pixel values are decreased excessively only at the thinned portions and neither thinning nor smoothing can be realized, causing the image quality to degrade.

SUMMARY OF THE INVENTION

An object of the present invention is to prevent degradation of image quality due to isolation of a thinned pixel.

In order to achieve the above object, according to one aspect of the present invention, the image processing apparatus includes a thinning processing unit which performs thinning processing on image data, a smoothing processing unit which performs smoothing processing on the image data, an edge direction determination unit which determines an edge direction with respect to each pixel of the image data, a blending processing unit which decides a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, and a thinning adjustment unit which determines whether a thinned pixel becomes isolated by change amounts in pixel value due to the thinning processing of the target pixel and the surrounding pixel, the thinning adjustment unit resetting the change amount in pixel value due to the thinning processing of the thinned pixel among the target pixel and the surrounding pixel adjacent to the target pixel in the edge direction or in an opposite-edge direction to a value of zero if the thinned pixel is determined to be isolated, and the blending processing unit uses the reset change amount in pixel value due to the thinning processing to decide the pixel value of the target pixel.

According to the other aspect of the present invention, the image processing method includes thinning of image data, smoothing of the image data, determining an edge direction with respect to each pixel of the image data, deciding a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, and determining whether a thinned pixel becomes isolated by change amounts in pixel value due to the thinning processing of the target pixel and the surrounding pixel thereof, resetting the change amount in pixel value due to the thinning processing of the thinned pixel among the target pixel and the surrounding pixel adjacent in the edge direction or in the opposite-edge direction of the target pixel to a value of zero if the thinned pixel is determined to be isolated, and in the deciding, the reset change amount in pixel value due to the thinning processing is used to decide the pixel value of the target pixel.

BRIEF DESCRIPTION OF THE DRAWINGS

The present invention will become more fully understood from the detailed description given hereinafter and the appended drawings. However, these shall not limit the present invention, and wherein:

FIG. 2 is a diagram showing a region of 7×7 pixels;

FIG. 15 is a flowchart of processing performed by the pixel value deciding unit in case 3;

FIGS. 16A and 16B are diagrams illustrating an assumed positional relationship between a target pixel and a surrounding pixel thereof in case 3;

DETAILED DESCRIPTION OF THE PREFERRED EMBODIMENTS

Hereinafter, an embodiment of an image processing apparatus and an image processing method according to the present invention will be explained with reference to the drawings.

Figure 1:
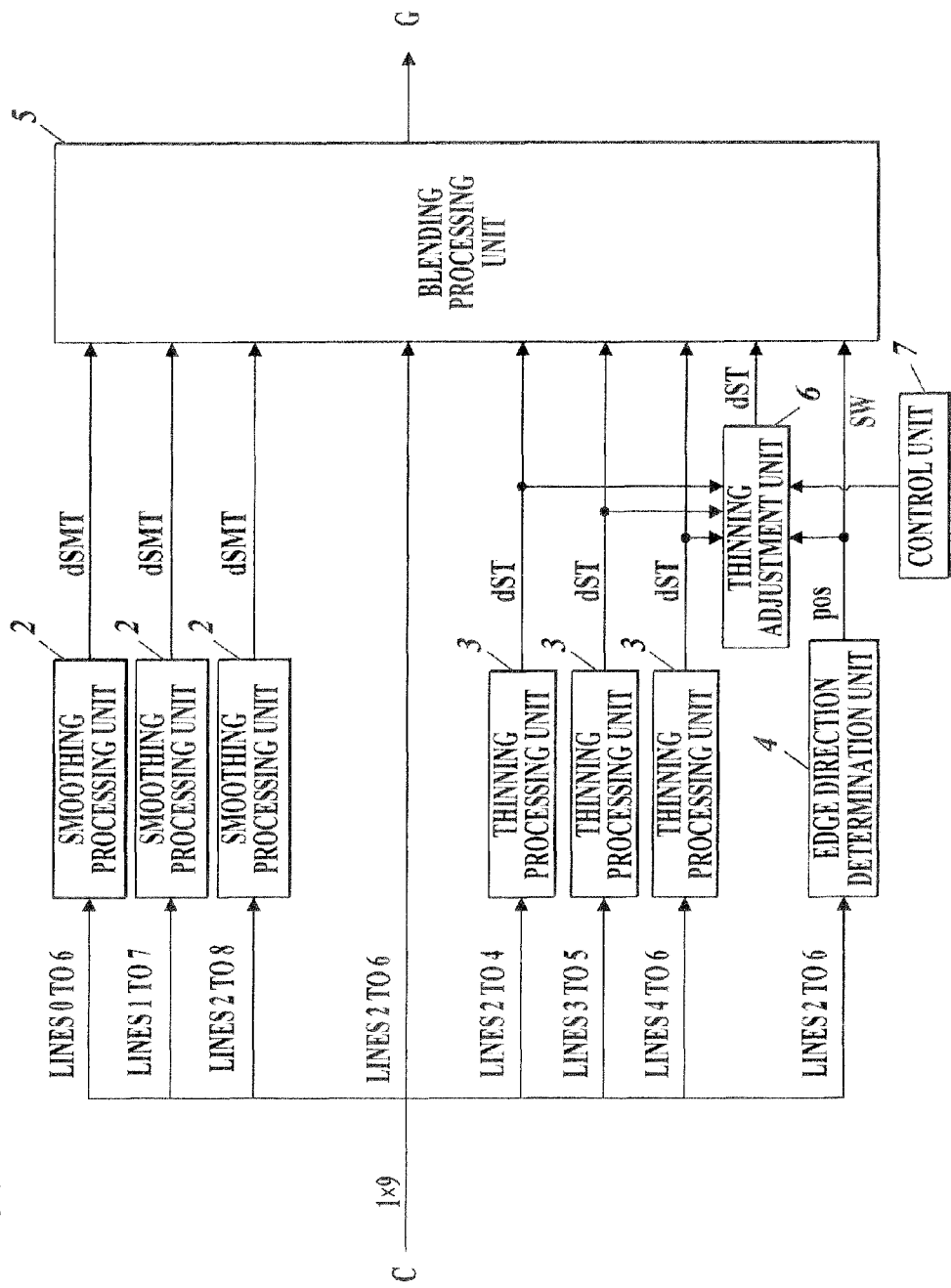
FIG. 1 is a configuration view of an image processing apparatus according to the embodiment.

FIG. 1 shows a configuration of an image processing apparatus 1 according to the embodiment.

The image processing apparatus 1 includes a smoothing processing unit 2, a thinning processing unit 3, an edge direction determination unit 4 and a blending processing unit 5 as shown in FIG. 1.

The image processing apparatus 1 includes a line memory for total of nine pixels of lines 0 to 8 in the sub-scanning direction and image data is input to and stored in the line memory while shifting by one pixel in the main scanning direction every clock. The image data is 8 bit and the value range of the pixel value is from 0 to 255. In a case of a color image, image data of four colors which are Y (yellow), M (magenta), C (cyan) and K (black) is input.

The smoothing processing unit 2 performs smoothing processing on each pixel of the image data. Smoothing processing is also called anti-aliasing processing.

Smoothing processing is performed in units of 7×7 pixels. The smoothing processing unit 2 obtains 7×7 pixels from the line memory by storing image data of seven lines for seven clocks, that is, for seven pixels in the main scanning direction.

Three smoothing processing units 2 are provided. Image data of lines 0 to 6 is input to the upper smoothing processing unit 2, image data of lines 1 to 7 is input to the middle smoothing processing unit 2, and image data of lines 2 to 8 is input to the lower smoothing processing unit 2.

FIG. 2 shows a region of 7×7 pixels which is input to the middle smoothing processing unit 2. In FIG. 2, the pixels are respectively assigned with identification numbers 01 to 49 to indicate the pixel locations.

Each smoothing processing unit 2 performs smoothing processing on the pixel located at the center of the 7×7 pixels, and calculates and outputs a change amount dSMT in pixel value due to smoothing processing. That is, pixel values of 1×7 pixels are input to each smoothing processing unit 2 every clock, and change amounts dSMT in pixel value of 1×3 pixels (pixels of identification numbers 18, 25 and 32) are output.

Figure 3:
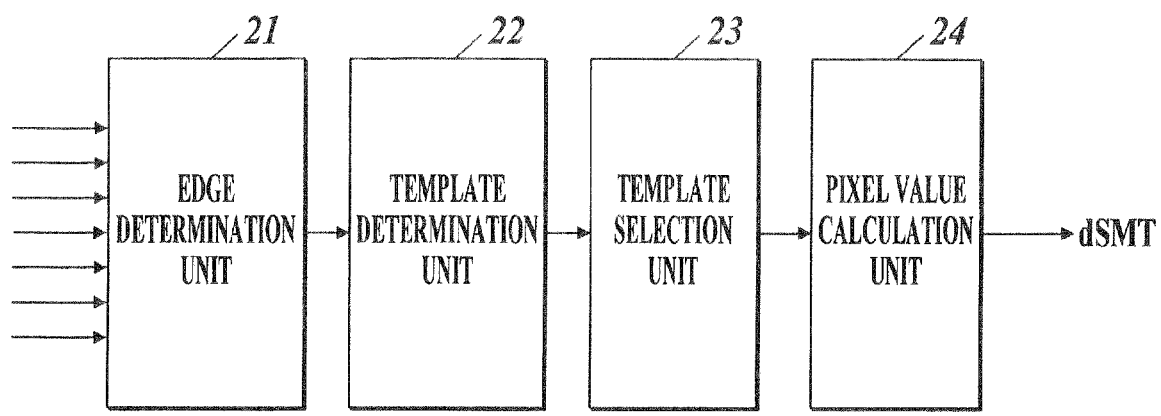
FIG. 3 is a configuration view of a smoothing processing unit.

Each smoothing processing unit 2 includes an edge determination unit 21, a template determination unit 22, a template selection unit 23 and a pixel value calculation unit 24 as shown in FIG. 3.

Though each smoothing processing unit 2 performs the processing on pixels at different location, the processing is the same in content. Therefore, smoothing processing will be explained by taking the middle smoothing processing unit 2 which performs smoothing processing on the target pixel of identification number 25 as an example.

The edge determination unit 21 determines whether an edge is included in the 7×7 pixels because the target to be smoothed by smoothing processing, that is, the pixel in which the pixel value thereof is to be changed is an edge of a character or a line drawing.

The edge determination unit 21 calculates a difference in pixel values between two adjacent pixels. If the difference is equal to or greater than threshold value th1, the edge determination unit 21 determines that there is an edge between the two pixels. If the difference is smaller than the threshold value th1, the edge determination unit 21 determines that there is no edge between the two pixels. Th1 is a threshold value which is determined in advance for the edge determination. The difference is calculated in absolute value and the two pixels whose difference is calculated are pixels adjacent to each other in a predetermined positional relationship.

The following is combinations of two pixels A and B whose difference is calculated. Each combination is expressed by "identification number of pixel A—identification number of pixel B".

03-10, 04-11, 05-12, 10-17, 10-18, 11-17, 11-18, 11-19, 12-18, 12-19, 15-16, 16-17, 16-24, 17-18, 17-23, 17-24, 18-19, 18-24, 18-25, 18-26, 19-20, 19-26, 19-27, 20-21, 20-26, 22-23, 23-24, 23-31, 24-25, 24-30, 24-31, 24-32, 25-26, 25-32, 26-27, 26-32, 26-33, 26-34, 27-28, 27-33, 29-30, 30-31, 31-32, 31-38, 31-39, 32-33, 32-38, 32-39, 32-40, 33-34, 33-39, 33-40, 34-35, 38-45, 39-46, 40-47.

When the edge determination unit 21 determines that there is an edge, the edge determination unit 21 outputs V[AB]=1. When the edge determination unit 21 determines that there is no edge, the edge determination unit 21 outputs V[AB]=0. In V[AB], A and B indicate two pixels whose difference was calculated, and the value of identification numbers 01 to 49 of each pixel A and B is input. For example, when it is determined that there is an edge between pixels A and B from the difference between the pixel A of identification number 03 and the pixel B of identification number 10, V[0310]=1 is output.

There are total of 56 combinations of pixels A and B, and total of 56 subtraction results need to be obtained for one clock as an arithmetic circuit. However, the number of subtraction can be reduced by optimizing the arithmetic circuit. The arithmetic circuit outputs the arithmetic result of the target pixel every clock, and the target pixel shifts to the right by one pixel every clock. Therefore, the pixels A and B wherein the subtraction was performed in the present clock become pixels A−1 and B−1 in the next clock. Then, the subtraction result V[AB] which was used in the present clock becomes the same as the value of V[(A−1)(B−1)] in the next clock. When another one clock elapses, this subtraction result V[(A−1) (B−1)] becomes the same value as V[(A−2) (B−2)]. By using such a characteristic, it is possible to reuse subtraction results which are stored as subtraction results of the same line by storing the subtraction result for six clocks.

The following expresses that one subtraction result can be reused as a subtraction result which is described on the immediate left thereof in the next clock or in the following clocks. According to this, one subtraction result can be reused as up to six subtraction results by storing the one subtraction result for six clocks. With a circuit configuration which performs such reusing of subtraction results, it is possible to reduce the number of subtraction which had to be performed 56 times to essentially 17 times.

V[0310]←V[0411]←V[0512]
V[1017]←V[1118]←V[1219]
V[1018]←V[1119]
V[1117]←V[1218]
V[1516]←V[1617]←V[1718]←V[1819]←V[1920]←V[2021]
V[1624]←V[1826]←V[1927]
V[1723]←V[1824]←V[2026]
V[1724]←V[1825]←V[1926]
V[2223]←V[2324]←V[2425]←V[2526]←V[2627]←V[2728]
V[2331]←V[2432]←V[2634]
V[2430]←V[2632]←V[2733]
V[2431]←V[2532]←V[2633]
V[2930]←V[3031]←V[3132]←V[3233]←V[3334]←V[3435]
V[3138]←V[3239]←V[3340]
V[3139]←V[3240]
V[3238]←V[3339]
V[3845]←V[3946]←V[4047]

The template determination unit 22 checks V[AB] which is output from the edge determination unit 21 against the templates and determines a matching template. The templates are designed so that edge patterns to be smoothed can be detected.

Figure 4:
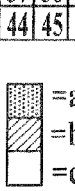
FIG. 4 is an example of templates which are used for detecting a pattern of an edge to be smoothed.

FIG. 4 shows an example of templates. In FIG. 4, the number above each template is an identification number which is appended to the template.

The pixels on the template are classified into three types which are a, b and c as shown in FIG. 4. The template determination unit 22 determines that a template is a match when V[AB]=0 between the pixels corresponding to the classification a, V[AB]=0 between the pixels corresponding to the classification b and V[AB]=1 between the pixels corresponding to the classification a and the pixels corresponding to the classification b on the template are fulfilled. Presence or absence of an edge does not matter in the pixel of classification c. In some cases, not only one template but a plurality of templates can be a match. The template determination unit 22 checks V[AB] against all the templates and detects all the matching templates.

For example, when all of V[1824]=0, V[2632]=0, V[1826]=1, V[1819]=0 and V[3132]=0 are met, the template determination unit 22 determines that the template of identification number 21 is a match. In addition, when all of V[2324]=0, V[3031]=0, V[1920]=0 and V[2627]=0 are met, the template determination unit 22 determines that not only the template of identification number 21, but also the template of identification number 213 is a match.

The template selection unit 23 selects one template from one or a plurality of matching templates obtained by checking against the templates by the template determination unit 22. A priority order is set for the templates shown in FIG. 4. The template selection unit 23 selects a template which has the highest priority from the matching templates according to the priority order. The priority order is set for the templates in the following descending order: identification number 24, 23, 22, 21, 233, 213, 243, 223, 252, 251, 254, 253, 262, 261, 264 and 263.

The pixel value calculation unit 24 uses pixel values of the pixels corresponding to the classifications a and b set on the template which was selected by the template selection unit 23 and calculates and outputs the change amount dSMT in pixel value of the target pixel due to smoothing processing of the target pixel.

Calculation formulae of dSMT are as follows. In the calculation formulae, C is a pixel value of each pixel indicated by the identification number inside the parenthesis. The pixel value of the target pixel is indicated by C[25].

When the identification number of the selected template is 21, 22, 23 or 24, $$dSMT=(C[18]+C[25]+C[32])/3-C[25]$$

When the identification number of the selected template is 213 or 233, $$dSMT=(C[18]\times 2+C[25]+C[32]\times 2)/5-C[25]$$

When the identification number of the selected template is 223 or 243, $$dSMT=(C[24]\times 2+C[25]+C[26]\times 2)/5-C[25]$$

When the identification number of the selected template is 251 or 252, $$dSMT=(C[25]\times 4+C[32])/5-C[25]$$

When the identification number of the selected template is 253 or 254, $$dSMT=(C[25]\times 4+C[18])/5-C[25]$$

When the identification number of the selected template is 261 or 262, $$dSMT=(C[25]\times 4+C[26])/5-C[25]$$

When the identification number of the selected template is 263 or 264, $$dSMT=(C[25]\times 4+C[24])/5-C[25]$$

By adding the obtained change amount dSMT to the pixel value of the target pixel, a pixel value of the target pixel after the smoothing processing is obtained. According to such smoothing processing, a target pixel corresponding to an edge to be smoothed can be detected by determining whether a difference in pixel value between adjacent two pixels is nearly the same value or a different value. Because the pixel value of the detected target pixel is converted to a weighted average value of pixel values of the target pixel and surrounding pixels thereof, smoothing processing can be performed for any pixel value of the foreground and the background including halftone.

The thinning processing unit 3 performs thinning processing on each pixel of image data.

Thinning processing is performed in units of 3×3 pixels. The thinning processing unit 3 inputs image data of three lines for three clocks from the line memory and obtains 3×3 pixels. Three thinning processing units 3 are provided. Image data of lines 2 to 4 is input to the upper thinning processing unit 3, image data of lines 3 to 5 is input to the middle thinning processing unit 3 and image data of lines 4 to 6 is input to the lower thinning processing unit 3. Each thinning processing unit 3 performs thinning processing on a pixel which is located at the center of the 3×3 pixels, and calculates and outputs the change amount dSMT in pixel value due to the thinning processing. That is, pixel values of 1×3 pixels are input to each thinning processing unit 3 every clock and the change amounts dSMT in pixel value of 1×3 pixels (pixels of identification numbers 18, 25 and 32) are output.

Figure 5:
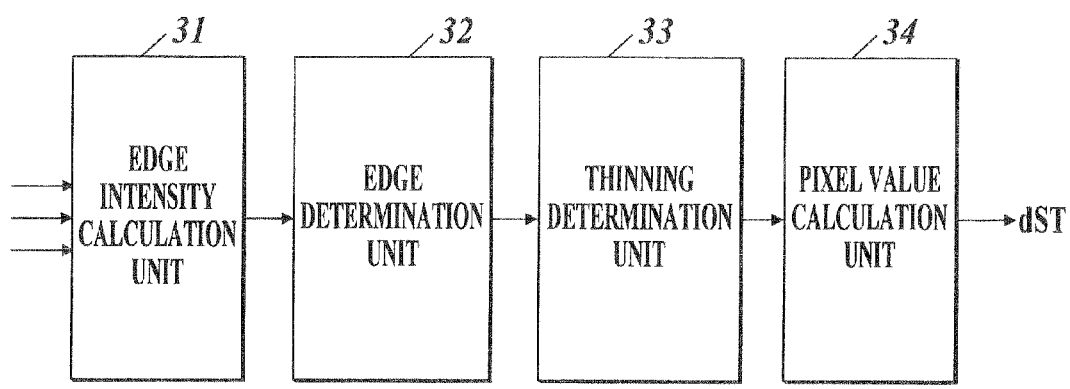
FIG. 5 is a configuration view of a thinning processing unit.

Each thinning processing unit 3 includes an edge intensity calculation unit 31, an edge determination unit 32, a thinning determination unit 33 and a pixel value calculation unit 34 as shown in FIG. 5.

Though each thinning processing unit 3 performs the processing on a pixel at different location, the processing is the same in content. Therefore, the thinning processing will be explained by taking the middle thinning processing unit 3 which performs processing on the target pixel of the identification number 25 as an example.

The edge intensity calculation unit 31 calculates the edge intensity in the target pixel. The edge intensity calculation unit 31 calculates differences E0 to E7 between the target pixel and the surrounding pixels thereof, and obtains the maximum value PED among them. The calculation formulae of E0 to E7 are as follows. C is a pixel value of each pixel which is indicated by the identification number inside the parenthesis.

$$E0=C[25]-C[17]$$

$$E1=C[25]-C[18]$$

$$E2=C[25]-C[19]$$

$$E3=C[25]-C[24]$$

$$E4=C[25]-C[26]$$

$$E5=C[25]-C[31]$$

$$E6=C[25]-C[32]$$

$$E7=C[25]-C[33]$$

The edge intensity calculation unit 31 inverts the signs of E0 to E7 and obtains the maximum value RED among them. The thinning processing unit 3 modifies to PED=0 if PED<RED, and modifies to RED=0 if RED<PED.

E0 to E7, PED and RED which are obtained as mentioned above are edge intensity.

The edge determination unit 32 obtains TPED and TRED by the following formulae using PED and RED which are obtained from image data of each color in a case of color image. The PED and RED shown with y, m, c and k inside the parenthesis indicate edge intensity which are obtained from image data of yellow, magenta, cyan and black color, respectively.

$$TPED=(PED[y]\times Wy+PED[m]\times Wm+PED[c]\times Wc+PED[k]\times Wk)$$

$$TRED=(RED[y]\times Wy+RED[m]\times Wm+RED[c]\times Wc+RED[k]\times Wk)$$

In the above formulae, Wy, Wm, Wc and Wk are predetermined coefficients and Wy+Wm+Wc+Wk≤255.

In a case of monochrome image, TPED=PED[k]×Wk and TRED=RED[k]×Wk.

TPED and TRED are values which are obtained by weighting the edge intensity PED and RED of each color with coefficients Wy, Wm, Wc and Wk equivalent to relative luminosity respectively and adding up the weighted values. TPED and TRED can be a visual index of density when each color is overlaid. Because the target of the thinning is an edge in the foreground, the edge determination unit 32 determines which of the target pixel and the surrounding pixels is the foreground or the background by determining magnitude relationship of TPED and TRED. If TPED>TRED, the edge determination unit 32 determines that the target pixel is an edge in the foreground which has a greater density than the background, and outputs ED=1. On the other hand, if TPED≤TRED, the edge determination unit 32 determines that the target pixel is not an edge in the foreground, and outputs ED=0.

The thinning determination unit 33 determines whether the target pixel which is determined to be an edge in the foreground can be a target of thinning. In a case wherein a target pixel which is an edge does not have a sufficient pixel value for thinning, that is, to be reduced, the target pixel need to be excluded from the target of the thinning, because the pixel value will be very small or vanished causing breaks in the image by reducing the pixel value. The thinning determination unit 33 compares the pixel value C[25] of the target pixel in each color to threshold value Th2. If the pixel value C[25] in any color is equal to or greater than the threshold value Th2, the thinning determination unit 33 determines that the pixel has a sufficient pixel value for the thinning, and outputs SS=1. On the other hand, if the pixel value C[25] of the target pixel in every color is smaller than the threshold value Th2, the thinning determination unit 33 determines that the target pixel is not a target of thinning because the pixel does not have a sufficient pixel value for the thinning, and outputs SS=0.

The pixel value calculation unit 34 calculates and outputs the change amount dST in pixel value of the target pixel due to thinning processing.

When ED=1 and SS=1, the target pixel is an edge and has a sufficient pixel value for thinning. Thus, the pixel value calculation unit 34 performs thinning on the target pixel and calculates the change amount dST in pixel value by the following formula. The change amount dST is obtained for each color by using PED and RED which are obtained for each color.

$$dST=(PED-RED) \times STVL$$

The above STVL is a coefficient to adjust intensity of the thinning, and is previously determined for each color. STVL can have a value range of 0 to 1.

By adding the obtained change amount dST to the original pixel value, the pixel value after thinning is obtained. As shown in the calculation formula of dST, thinning processing not only includes a case wherein dST is a negative value and the pixel value of the target pixel is decreased to literally thin the target pixel, but also includes a case wherein dST is a positive value and the pixel value of the target pixel is increased to thicken the target pixel.

If ED=1 and SS=1 is not met, the target pixel is not an edge, or is an edge which does not have a sufficient pixel value for thinning. Thus, the pixel vale calculation unit 34 does not perform thinning of the target pixel, and outputs the change amount dST=0 in pixel value.

The edge direction determination unit 4 determines an edge direction in each pixel of the image data.

The edge direction is determined in units of 5×5 pixels. The edge direction determination unit 4 inputs image data of lines 2 to 6 for five clocks from the line memory and obtains 5×5 pixels with the target pixel of the blending processing unit 5 located at the center thereof. The edge direction determination unit 4 determines and outputs the edge direction pos in the target pixel which is located at the center of the input 5×5 pixels. That is, pixel values of 1×5 pixels are input to the edge direction determination unit 4 and the edge direction pos for one pixel is output every clock. The edge direction is a direction from a pixel with a small pixel value to a pixel with a large pixel value. When the target pixel is an edge in the foreground or the background, the direction from the background to the foreground is determined as the edge direction.

The edge direction determination unit 4 calculates SP which is a difference between the target pixel (pixel of identification number 25) and each of the eight surrounding pixels (pixels of identification numbers 17, 18, 19, 24, 26, 31, 32 and 33) which are adjacent to the target pixel, and SF which is a difference between the target pixel (pixel of identification number 25) and each of the surrounding pixels (pixels of identification numbers 11, 23, 27 and 39) which are two pixels away from the target pixel in upper, lower, left and right directions.

The calculation formulae are as follows. C is a pixel value of each pixel indicated by the identification number inside the parenthesis.

$$SP[u]=C[25]-C[18]$$

$$SP[l]=C[25]-C[24]$$

$$SP[r]=C[25]-C[26]$$

$$SP[d]=C[25]-C[32]$$

$$SF[u]=C[25]-C[11]$$

$$SF[l]=C[25]-C[23]$$

$$SF[r]=C[25]-C[27]$$

$$SF[d]=C[25]-C[39]$$

The edge direction determination unit 4 respectively determines edge direction x in the main scanning direction and edge direction y in the sub scanning direction of the target pixel. The x and y can have a value of 0 or ±1. "0" indicates that there is no edge and "1" indicates that there is an edge. Plus and minus signs correspond to the directions.

Figure 6:
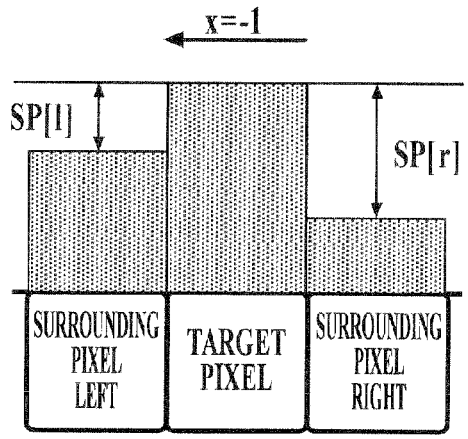
FIG. 6 is a determination example of an edge direction.
Figure 7:
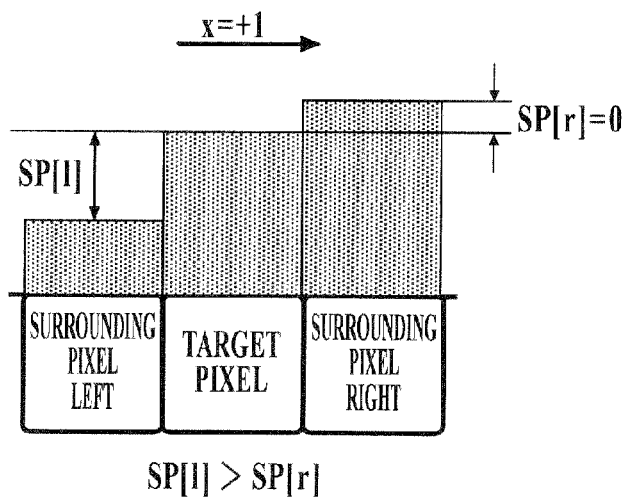
FIG. 7 is a determination example of an edge direction.

For example, if SP[l]<SP[r], the pixel value of the right surrounding pixel is smaller between the pixels on left and right of the target pixel as shown in FIG. 6. Thus, the edge direction determination unit 4 determines the edge direction in the main scanning direction to be left and outputs x=−1. On the other hand, if SP[l]>SP[r], the pixel value of the left surrounding pixel is smaller between the pixels on left and right of the target pixel as shown in FIG. 7. Thus, the edge direction determination unit 4 determines the edge direction in the main scanning direction to be right and outputs x=+1.

Similarly, the edge direction in the sub scanning direction is determined by comparing SP[u] and SP[d]. If SP[u]>SP[d], the edge direction determination unit 4 determines the edge direction in the sub scanning direction to be down, and outputs y=−1. If SP[u]<SP[d], the edge direction determination unit 4 determines the edge direction in the sub scanning direction to be up, and outputs y=+1.

In a case of SP[l]=SP[r], there is no difference in pixel value between left and right pixels of the target pixel. Similarly, in a case of SP[u]=SP[d], there is no difference in pixel value between the pixels above and below the target pixel. In such cases, the edge direction determination unit 4 determines that there is no edge on the left and right or above and below of the target pixel, and outputs x=0 or y=0, respectively.

When the target pixel is not an edge but an inner edge which is one pixel inside than the edge, the edge direction determination unit 4 determines the edge direction as well.

When the target pixel is an inner edge, the edge direction is x=y=0. Thus, when the edge direction is x=y=0, the edge direction determination unit 4 modifies edge directions x and y by SF[1], SF[r], SF[u] and SF[d] which are obtained from the surrounding pixels located two pixels away from the target pixel.

The edge direction determination unit 4 modifies x=0 to x=−1 if SF[1]<SF[r], and modifies x=0 to x=+1 if SF[1]>SF[r]. Similarly, the edge direction determination unit 4 modifies y=0 to y=−1 if SF[u]>SF[d], and modifies y=0 to y=+1 if SF[u]<SF[d]. If SF[1]=SF[r], the edge direction determination unit 4 does not perform modification and outputs x=0 as it is. In a case of SF[u]=SF[d], the edge direction determination unit 4 does not perform modification as well and outputs y=0 as it is.

Figure 8:
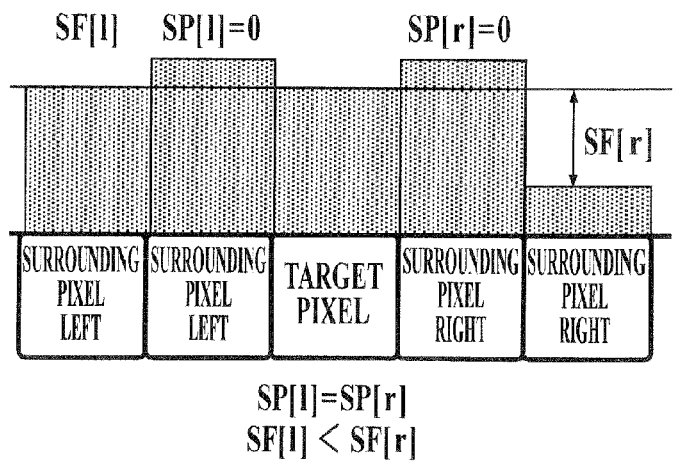
FIG. 8 is a determination example of an edge direction.

For example, if the surrounding pixel on the right which is two pixels away from the target pixel is an edge and the target pixel is an inner edge as shown in FIG. 8, the edge direction determination unit 4 determines that x=0 because SP[1]=SP[r]. However, x=0 is modified to be x=−1 because SF[1]<SF[r].

The edge direction determination unit 4 determines and outputs the overall edge direction pos by the combination of edge direction x in the main scanning direction and edge direction y in the sub scanning direction. Pos can have a value of 0 to 4. 0 indicates center (no edge), 1 indicates leftward direction, 2 indicates rightward direction, 3 indicates upward direction and 4 indicates downward direction. Edge directions pos corresponding to combinations of x and y are as follows.

When x=1 and y=−1, pos=4
When x=1 and y=0, pos=2
When x=1 and y=+1, pos=2
When x=0 and y=−1, pos=4
When x=0 and y=0, pos=0
When x=0 and y=+1, pos=3
When x=−1 and y=−1, pos=1
When x=−1 and y=0, pos=1
When x=−1 and y=+1, pos=3

The blending processing unit 5 decides the pixel value of each pixel when thinning processing and smoothing processing are realized at the same time.

The blending processing unit 5 inputs image data of lines 2 to 6 of the line memory for five clocks and obtains 5×5 pixels having the target pixel of identification number 25 located at the center thereof. Also, the blending processing unit 5 shifts the processing results (change amounts dSMT and dST) of 1×3 pixels which are output from the smoothing processing unit 2 and the thinning processing unit 3 by three pixels in the main scanning direction, and inputs processing results for 3×3 pixels having the target pixel of identification number 25 located at the center thereof. The blending processing unit 5 also inputs the edge direction pos of the target pixel from the edge direction determination unit 4. The blending processing unit 5 decides the pixel value G of when both thinning and smoothing are realized at the same time in the target pixel depending on the combination of whether thinning is performed or not and whether smoothing is performed or not on the target pixel. To decide the pixel value G, each pixel value C of the target pixel, surrounding pixels adjacent to the target pixel in the upper, lower, left and right directions and surrounding pixels which are two pixels away from the target pixel in the upper, lower, left and right directions of the target pixel, the change amounts dST and dSMT in pixel value of the target pixel and in pixel values of the surrounding pixels adjacent to the target pixel in the upper, lower, left and right directions, and the edge direction pos on the target pixel are used.

Figure 9:
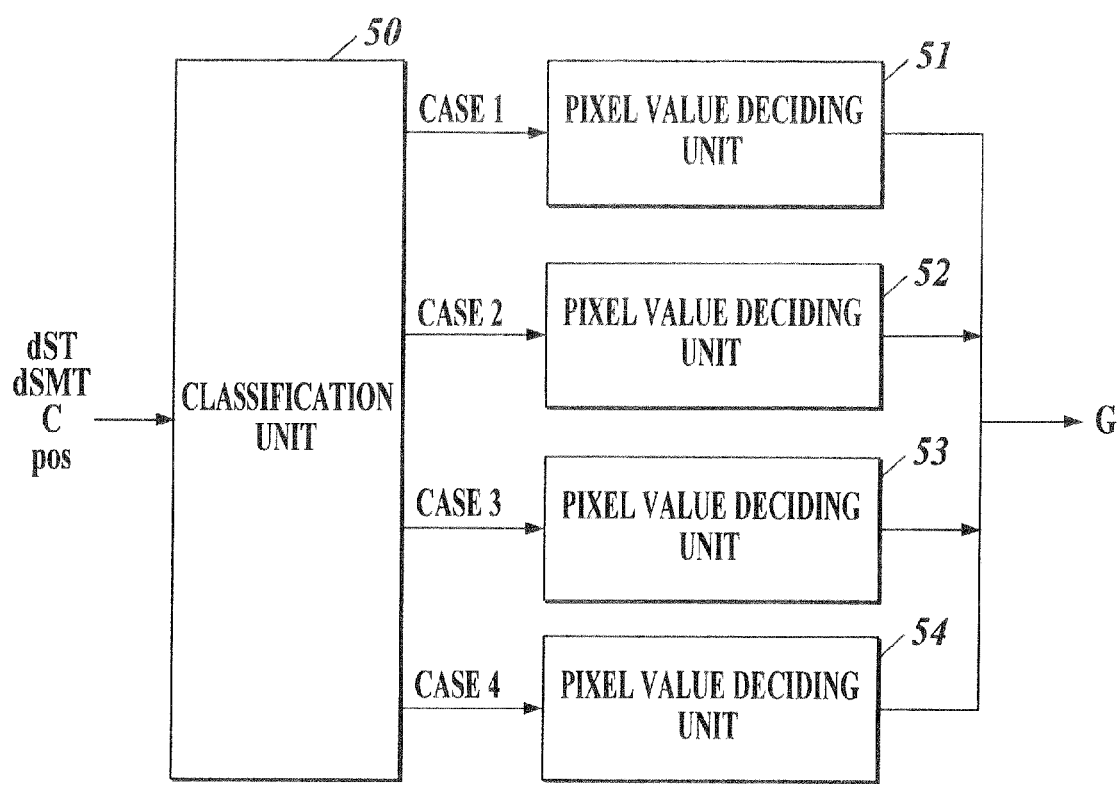
FIG. 9 is a configuration view of a blending processing unit.

The blending processing unit 5 includes a classification unit 50 and pixel value deciding units 51 to 54 as shown in FIG. 9.

The classification unit 50 classifies the state of thinning and smoothing in the target pixel into cases 1 to 4 depending on the combination of whether thinning is performed or not and whether smoothing is performed or not on the target pixel. Whether the thinning is performed or not and whether the smoothing is performed or not can be determined by whether the values of the change amounts dST and dSMT are zero. The classification unit 50 determines that thinning is performed on the target pixel as a result of thinning processing if the change amount dST[25] which is input from the thinning processing unit 3 with regard to the target pixel meets dST[25]≠0, and determines that thinning is not performed if the change amount dST[25] meets dST[25]=0. Similarly, the classification unit 50 determines that smoothing is performed if the change amount dSMT[25] which is input from the smoothing processing unit 2 with regard to the target pixel meets dSMT[25]≠0, and determines that smoothing is not performed if the change amount dSMT[25] meets dSMT[25]=0.

Figure 10:
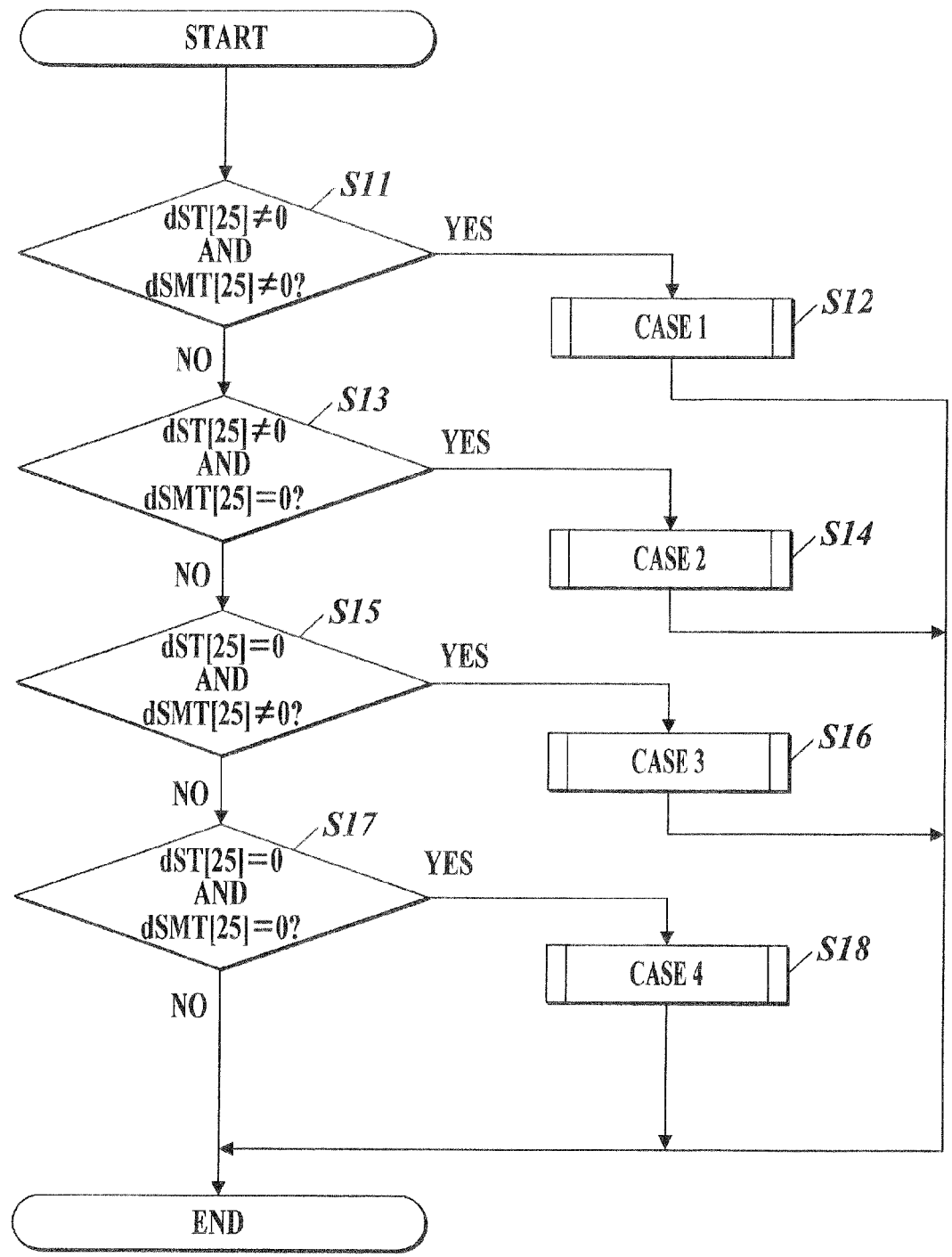
FIG. 10 is a flowchart of processing performed by a classification unit.

FIG. 10 is a flowchart showing a flow of processing performed by the classification unit 50.

As shown in FIG. 10, when the change amounts of the target pixel meet dST[25]≠0 and dSMT[25]≠0 (step S11; Y), the classification unit 50 classifies the case into case 1 (step S12). When the change amounts of the target pixel meet dST[25]≠0 and dSMT[25]=0 (step S11; N, S13; Y), the classification unit 50 classifies the case into case 2 (step S14). When the change amounts of the target pixel meet dST[25]=0 and dSMT[25]≠0 (step S13; N, S15; Y), the classification unit 50 classifies the case into case 3 (step S16). When the change amounts of the target pixel meet dST[25]=0 and dSMT[25]=0 (step S15; N, S17; Y), the classification unit 50 classifies the case into case 4 (step S18).

The classification unit 50 outputs the change amounts dST and dSMT, pixel value C and edge direction pos to the pixel value deciding unit 51 in case 1, to the pixel value deciding unit 52 in case 2, to the pixel value deciding unit 53 in case 3 and to the pixel value deciding unit 54 in case 4.

The pixel value deciding units 51 to 54 determine the pixel value G[25] of the target pixel of when both thinning processing and smoothing processing are realized at the same time depending on the cases 1 to 4, respectively.

<Case 1>

Figure 11:
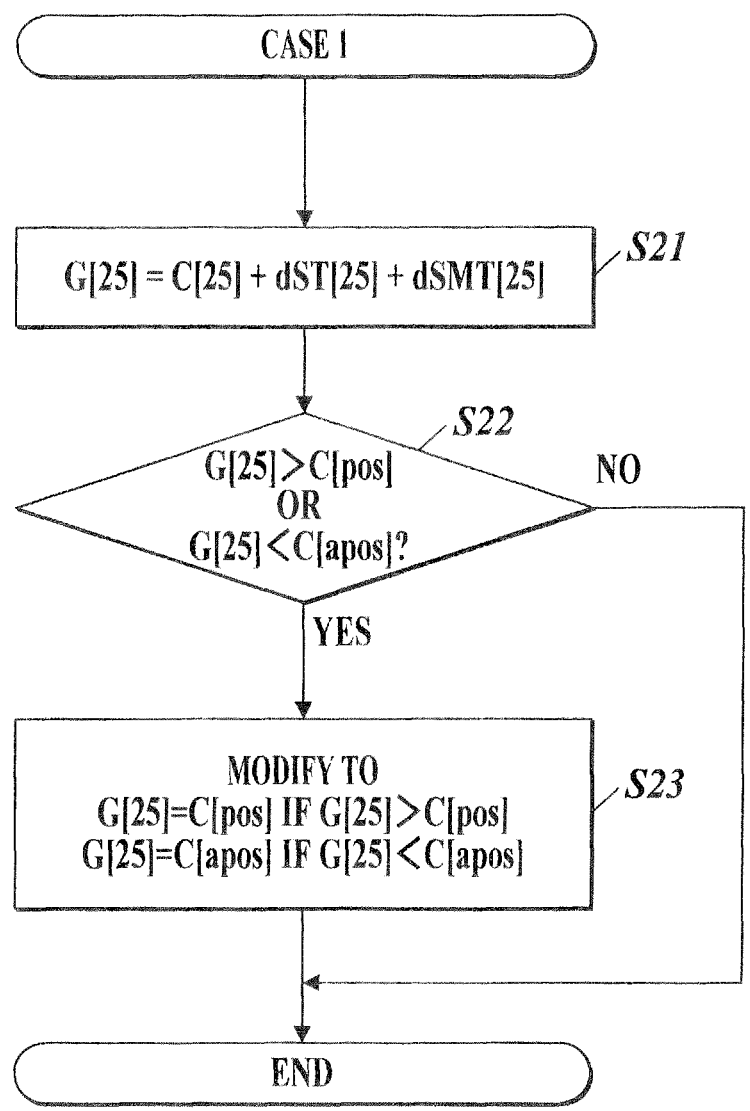
FIG. 11 is a flowchart of processing performed by a pixel value deciding unit in case 1.

FIG. 11 is a flowchart of processing which is executed by the pixel value deciding unit 51 in case 1.

Figure 12A:
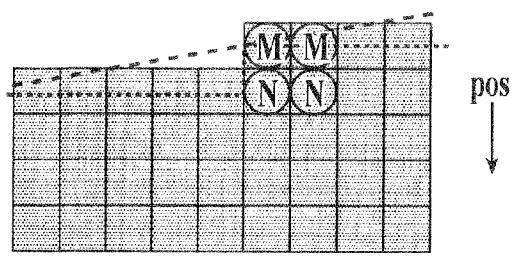
FIGS. 12A and 12B are diagrams illustrating an assumed positional relationship between a target pixel and a surrounding pixel thereof in case 1.
Figure 12B:
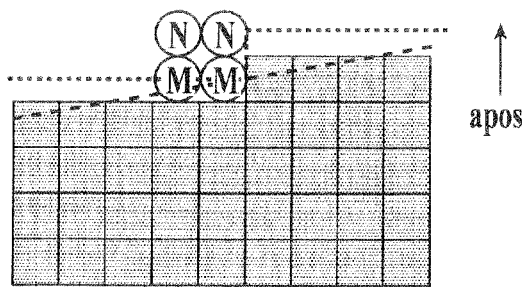

In case 1, both thinning and smoothing are performed on the target pixel, and thus the target pixel is assumed to be an edge in foreground as shown in FIG. 12A or an edge in background as shown in FIG. 12B. If the target pixel is an edge in foreground, both of the change amounts dST and dSMT of the target pixel M are negative values as shown in FIG. 12A, and thus the pixel value is decreased by the thinning processing and the smoothing processing. If the target pixel is an edge in background, both of the change amounts dST and dSMT of the target pixel M are positive values as shown in FIG. 12B, and thus the pixel value is increased by the thinning processing and the smoothing processing.

In both cases, the target pixel M is thinned and smoothed, and the surrounding pixel N adjacent to the target pixel M in the edge direction pos or in the opposite-edge direction apos which is an opposite direction of the edge direction is not thinned nor smoothed. Therefore, the pixel value deciding unit 51 decides and outputs the value which is obtained by adding the change amounts dST[25] and dSMT[25] to the original pixel value C[25] of the target pixel as the pixel value G[25] of the target pixel when thinning processing and smoothing processing are realized at the same time as shown in FIG. 11 (step S21).

It does not appear natural if the decided pixel value G[25] of the target pixel does not range between the pixel value of the foreground and the pixel value of the background because the density of the target pixel stands out at the border of the foreground and the background. Therefore, if the pixel value G[25] of the target pixel is larger than the pixel value C[pos] of the foreground, that is, the surrounding pixel adjacent to the target pixel in the edge direction (step S22; Y), the pixel value deciding unit 51 modifies the decided pixel value G[25] of the target pixel to the pixel value of the foreground C[pos] (step S23). If the pixel value G[25] of the target pixel is smaller than the pixel value C[apos] of the background, that is, the surrounding pixel adjacent to the target pixel in the opposite-edge direction of the target pixel (step S22; Y), the pixel value deciding unit 51 modifies the decided pixel value G[25] of the target pixel to the pixel value C[apos] of the background (step S23). Apos is set to have a value of direction which is opposite of the edge direction pos. That is, apos=2 is set if pos=1, and apos=4 is set if pos=3. If there is no edge direction, pos=apos=0.

<Case 2>

Figure 13:
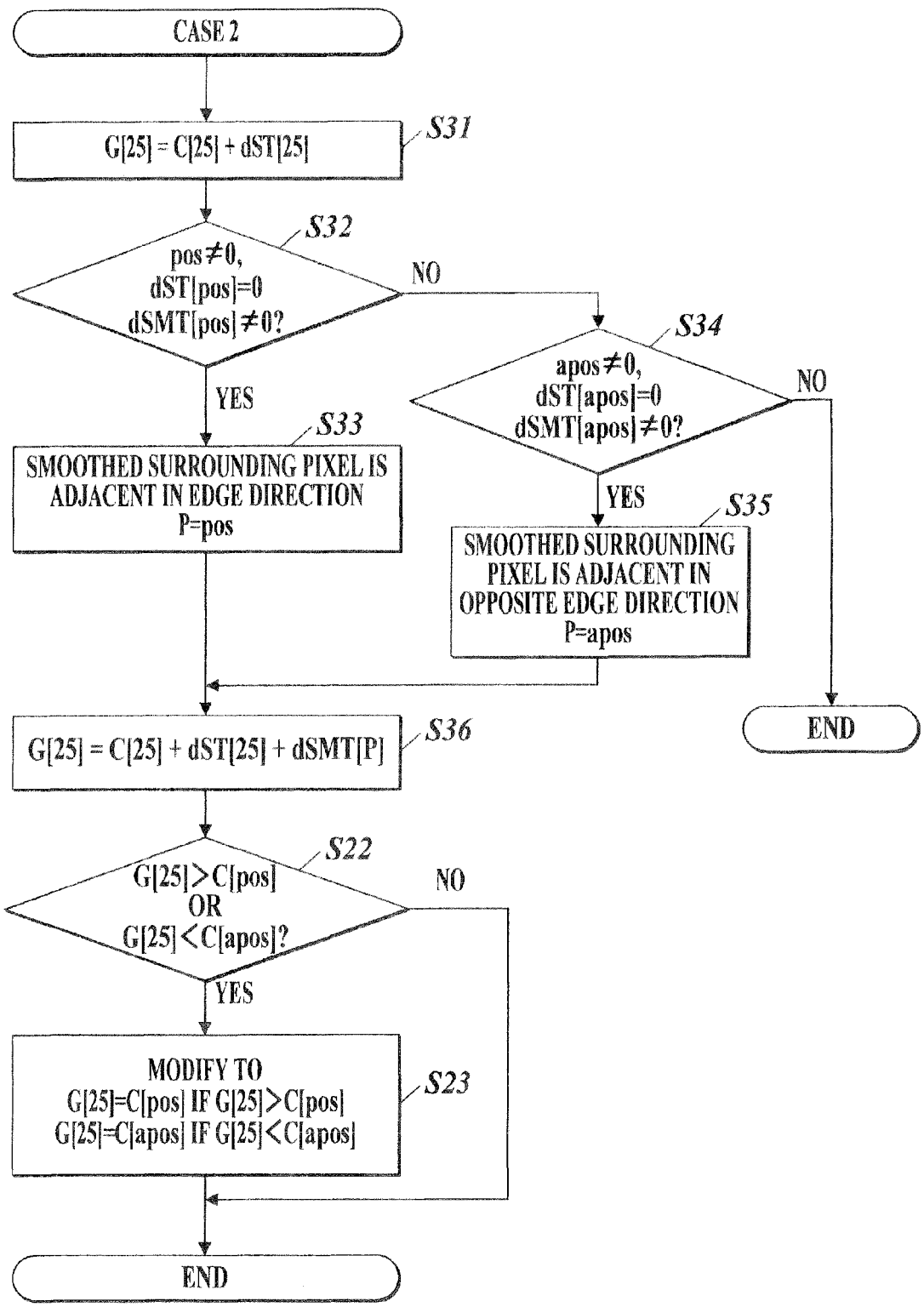
FIG. 13 is a flowchart of processing performed by the pixel value deciding unit in case 2.

FIG. 13 is a flowchart of processing which is executed by the pixel value deciding unit 52 in case 2.

Figure 14A:
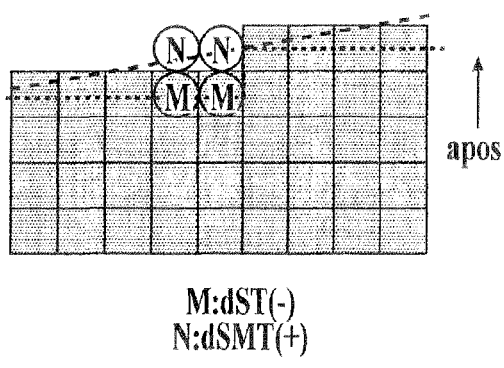
FIGS. 14A and 14B are diagrams illustrating an assumed positional relationship between a target pixel and a surrounding pixel thereof in case 2.
Figure 14B:
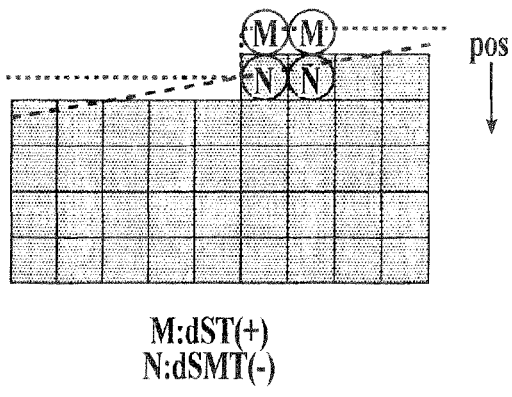

In case 2, only the thinning is performed on the target pixel, and thus the target pixel is assumed to be an edge in foreground as shown in FIG. 14A or an edge in background as shown in FIG. 14B. If the target pixel is an edge in foreground, the change amount dST of the target pixel M is a negative value as shown in FIG. 14A, and the pixel value is decreased due to thinning processing. The change amount dSMT of the surrounding pixel N adjacent to the target pixel M in the opposite-edge direction apos is a positive value, and the pixel value is increased due to smoothing processing. If the target pixel is an edge in background, the change amount dST of the target pixel M is a positive value as shown in FIG. 14B, and the pixel value is increased due to thinning processing. The change amount dSMT of the surrounding pixel N adjacent to the target pixel M in the edge direction pos is a negative value, and the pixel value is decreased due to smoothing processing.

In such way, when the surrounding pixel which is not thinned but is smoothed is adjacent to the target pixel in the edge direction pos or in the opposite-edge direction apos, the target pixel being thinned, the pixel value deciding unit 52 decides the pixel value of the surrounding pixel as well as the target pixel of when thinning processing and smoothing processing are realized at the same time.

Because only the thinning is performed on the target pixel, the pixel value deciding unit 52 temporarily decides the value obtained by adding the change amount dST[25] in pixel value of the target pixel due to thinning processing to the original pixel value C[25] of the target pixel as the pixel value G[25] of the target pixel of when thinning processing and smoothing processing are realized at the same time as shown in FIG. 13 (step S31). Subsequently, the pixel value deciding unit 52 determines in which of the edge direction pos and the opposite-edge direction apos the smoothed surrounding pixel is adjacent to the target pixel.

If the edge direction pos, the change amounts dST[pos] and dSMT[pos] which are input with regard to the surrounding pixel adjacent to the target pixel in the edge direction pos meet pos≠0, dST[pos]=0 and dSMT[pos]≠0 (step S32; Y), the pixel value deciding unit 52 determines that the smoothed surrounding pixel is adjacent to the target pixel in the edge direction pos (step S33).

If the opposite-edge direction apos, the change amounts dST[apos] and dSMT[apos] which are input with regard to the surrounding pixel adjacent to the target pixel in the opposite-edge direction apos meet apos≠0, dST[apos]=0 and dSMT[apos]≠0 (step S32; N, S34; Y), the pixel value deciding unit 52 determines that the smoothed surrounding pixel is adjacent in the background, that is, adjacent to the target pixel in the opposite-edge direction apos (step S35).

If none of the conditions is met (step S34; N), the pixel value deciding unit 52 determines that the smoothed surrounding pixel is not adjacent to the target pixel in the edge direction pos nor in the opposite-edge direction apos, and outputs the pixel value G[25] of the target pixel which was decided in step S31.

When the direction in which the smoothed surrounding pixel is adjacent to the target pixel is specified, the pixel value deciding unit 52 decides the value which is obtained by adding the change amount dST[25] in pixel value of the target pixel due to thinning processing and the change amount dSMT[P] in pixel value of the surrounding pixel due to smoothing processing to the original pixel value C[25] of the target pixel as the pixel value G[25] of the target pixel (step S36). Pos or apos is input for P. If the smoothed surrounding pixel is adjacent to the target pixel in the edge direction pos, dSMT[pos] is used for dSMT[P]. If the smoothed surrounding pixel is adjacent to the target pixel in the opposite-edge direction apos, dSMT[apos] is used for dSMT[P].

Thereafter, the processing in case 2 is same as in case 1 in the respect that the pixel value G[25] of the target pixel is modified by pixel values of the foreground and the background. Therefore, same step numbers are used for the steps in FIG. 13 which are same as those in FIG. 11 and the explanation thereof is omitted.

<Case 3>

FIG. 15 is a flowchart of processing which is executed by the pixel value deciding unit 53 in case 3.

In case 3, only the smoothing is performed on the target pixel, and thus the target pixel is assumed to be an edge in background as shown in FIG. 16A or an edge in foreground as shown in FIG. 16B. If the target pixel is an edge in background, the change amount dSMT of the target pixel M is a positive value as shown in FIG. 16A and the pixel value is increased due to the smoothing processing. The change amount dST of the surrounding pixel N adjacent to the target pixel M in the edge direction pos is a negative value, and the pixel value is decreased due to the thinning processing. If the target pixel is an edge in foreground, the change amount dSMT of the target pixel M is a negative value as shown in FIG. 16B and the pixel value is decreased due to the smoothing processing. The change amount dST of the surrounding pixel N adjacent to the target pixel M in the opposite-edge direction apos is a positive value, and the pixel value is increased due to the thinning processing.

In such way, when the thinned surrounding pixel is adjacent to the target pixel in the edge direction pos or in the opposite-edge direction apos, the target pixel being smoothed, the pixel value deciding unit 53 decides the pixel value G[P] of the surrounding pixel as well as the target pixel of when thinning processing and smoothing processing are realized at the same time.

Because only the smoothing is performed on the target pixel, the pixel value deciding unit 53 temporarily decides the value obtained by adding the change amount dSMT[25] of the target pixel due to smoothing processing to the original pixel value C[25] of the target pixel as the pixel value G[25] of the target pixel of when thinning processing and smoothing processing are realized at the same time as shown in FIG. 15 (step S41). Subsequently, the pixel value deciding unit 53 determines in which direction of the edge direction pos or the opposite-edge direction apos the thinned surrounding pixel is adjacent to the target pixel.

If the edge direction pos, the change amounts dST[pos] and dSMT[pos] which are input with regard to the surrounding pixel adjacent to the target pixel in the edge direction pos meet pos≠0, dST[pos]≠0 and dSMT[pos]=0 (step S42; Y), the pixel value deciding unit 53 determines that the thinned surrounding pixel is adjacent to the target pixel in the edge direction pos (step S43).

If the opposite-edge direction apos, the change amounts dST[apos] and dSMT[apos] which are input on the surrounding pixel adjacent to the target pixel in the opposite-edge direction apos meet apos≠0, dST[apos]≠0 and dSMT[apos]=0 (step S42; N, S44; Y), the pixel value deciding unit 53 determines that the thinned surrounding pixel is adjacent to the target pixel in the opposite-edge direction apos (step S45).

If none of the conditions is met (step S44; N), the pixel value deciding unit 53 determines that the thinned surrounding pixel is not adjacent to the target pixel in the edge direction pos nor in the opposite-edge direction apos, and outputs the pixel value G[25] of the target pixel which was decided in step S41.

When the direction in which the thinned surrounding pixel is adjacent is specified, the pixel value deciding unit 53 inputs the larger value for L and the smaller value for S among the pixel value C[25] of the target pixel and the pixel value C[P] of the thinned surrounding pixel (step S46), and calculates temp by the following formula (step S47).

$$temp = L + S + dST[P] + dSMT[25]$$

For P, pos or apos is input. If the thinned surrounding pixel is adjacent to the target pixel in the edge direction pos, C[P] and dST[P] are C[pos] and dST[pos], respectively. If the thinned surrounding pixel is adjacent to the target pixel in the opposite-edge direction, C[P] and dST[P] are C[apos] and dST[apos], respectively.

Temp is the sum which is obtained by adding up the pixel value of the smoothed target pixel and the pixel value of the thinned surrounding pixel. The pixel value deciding unit 53 distributes the temp to the target pixel and the surrounding pixel.

If the total of the change amount dSMT[25] in pixel value of the target pixel due to smoothing processing and the change amount dST[P] in pixel value of the surrounding pixel due to thinning processing is a positive value, temp which is the sum of the pixel values of these two pixels becomes larger than L+S which is total of the original pixel values due to smoothing of the target pixel and thinning of the surrounding pixel. In this case, the pixel value deciding unit 53 distributes the pixel value L to the pixel which has the larger original pixel value, and distributes the rest of the pixel value temp-L to the other pixel value. When the sum temp is larger than twice the value of L, both the target pixel and the surrounding pixel have pixel values which are equal to or larger than L, and do not fit in the foreground nor the background naturally. In this case, the pixel value deciding unit 53 distributes the largest acceptable value of L to both pixels.

As shown in FIG. 15, when temp>L+S is fulfilled (step S48; Y) and temp<L×2 is fulfilled (step S49; Y), the pixel value deciding unit 53 decides the pixel value G[25] of the target pixel=L and the pixel value G[P] of the surrounding pixel=temp-L if the original pixel value C[25] of the target pixel is larger than the original pixel value C[P] of the surrounding pixel. Further, the pixel value deciding unit 53 decides the pixel value G[25] of the target pixel=temp-L and the pixel value G[P] of the surrounding pixel=L if the original pixel value C[25] of the target pixel is smaller than the original pixel value C[P] of the surrounding pixel, (step S50).

When temp>L+S is fulfilled (step S48; Y) and temp<L×2 is not fulfilled (step S49; N), the pixel value deciding unit 53 decides the pixel value G[25] of the target pixel=L and the pixel value G[P] of the surrounding pixel=L (step S51).

On the other hand, if the total of the change amount dSMT[25] in pixel value of the target pixel due to smoothing processing and the change amount dST[P] in pixel value of the surrounding pixel due to thinning processing is a negative value, temp which is the sum of the pixel values of these two pixels becomes smaller than L+S which is the total of the original pixel values due to smoothing of the target pixel and thinning of the surrounding pixel. In this case, the pixel value deciding unit 53 distributes the pixel value S to the pixel which has the smaller original pixel value, and distributes the rest of the pixel value temp-S to the other pixel. When the sum temp is smaller than twice the value of S, both the target pixel and the surrounding pixel have pixel values which are equal to or smaller than S, and do not fit in the foreground nor the background naturally. In this case, the pixel value deciding unit 53 distributes the largest acceptable value of S to both pixels.

As shown in FIG. 15, when temp>L+S is not fulfilled (step S48; N) and temp>S×2 is fulfilled (step S52; Y), if the original pixel value C[25] of the target pixel is larger than the original pixel value C[P] of the surrounding pixel, the pixel value deciding unit 53 decides the pixel value G[25] of the target pixel=temp-S and the pixel value G[P] of the surrounding pixel=S. If the original pixel value C[25] of the target pixel is smaller than the original pixel value C[P] of the surrounding pixel, the pixel value deciding unit 53 decides the pixel value G[25] of the target pixel=S and the pixel value G[P] of the surrounding pixel=temp-S (step S53).

When temp>L+S is not fulfilled (step S48; N) and temp>S×2 is not fulfilled, either (step S52; N), the pixel value deciding unit 53 determines the pixel value G[25] of the target pixel=S and the pixel value G[P] of the surrounding pixel=S (step S54).

<Case 4>

Figure 17:
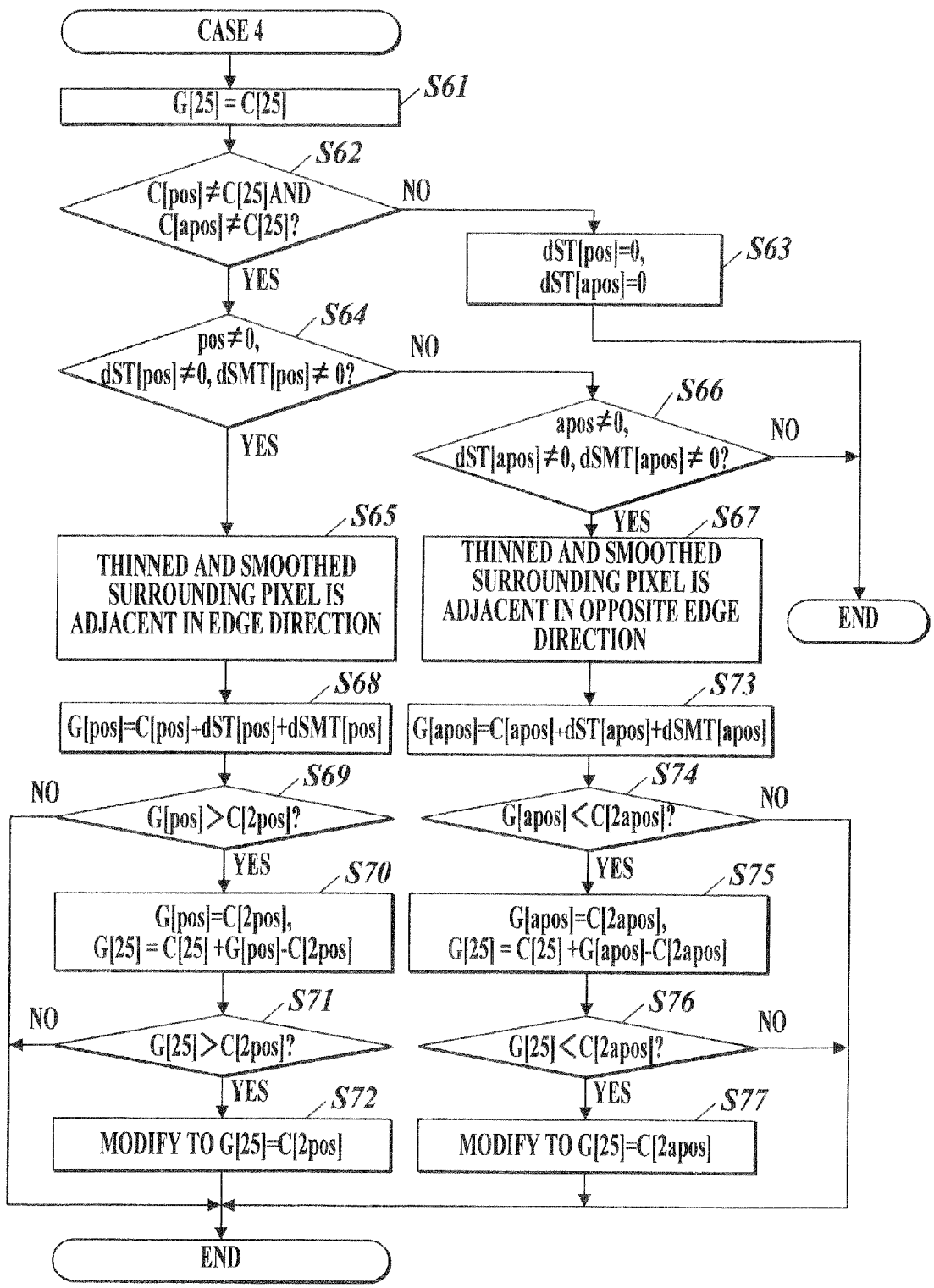
FIG. 17 is a flowchart of processing performed by the pixel value deciding unit in case 4.

FIG. 17 is a flowchart of processing which is executed by the pixel value deciding unit 54 in case 4.

Figure 18A:
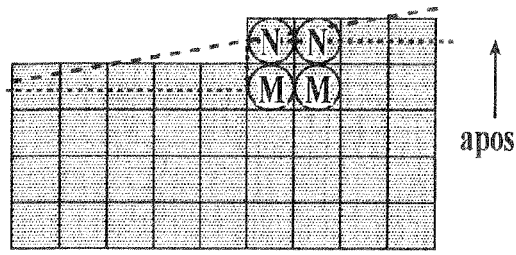
FIGS. 18A and 18B are diagrams showing an assumed positional relationship between a target pixel and a surrounding pixel thereof in case 4.
Figure 18B:
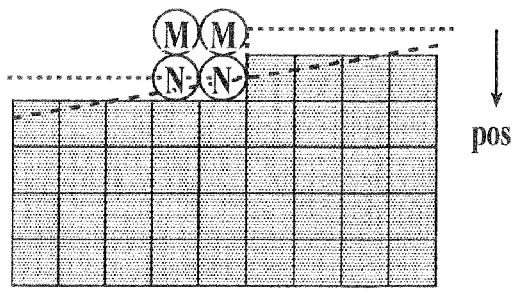

In case 4, neither thinning nor smoothing is performed on the target pixel, and thus the target pixel is assumed to be an inner edge in foreground as shown in FIG. 18A or an inner edge in background as shown in FIG. 18B. If the target pixel is an inner edge in foreground, neither thinning nor smoothing is performed on the target pixel M as shown in FIG. 18A. However, the change amounts dST and dSMT of the surrounding pixel N adjacent to the target pixel M in the opposite-edge direction apos are both negative values, and thus the pixel value is decreased due to thinning processing and smoothing processing. If the target pixel is an inner edge in background, neither thinning nor smoothing is performed on the target pixel M as shown in FIG. 18B. However, the change amounts dST and dSMT of the surrounding pixel N adjacent to the target pixel M in the edge direction are both positive values, and thus the pixel value is increased due to thinning processing and smoothing processing.

In such way, when the surrounding pixel which is both thinned and smoothed is adjacent to the target pixel in the edge direction pos or in the opposite-edge direction apos, the pixel value deciding unit 53 decides the pixel value G[P] of when thinning processing and smoothing processing are realized at the same time on the surrounding pixel as well as the target pixel.

Because neither thinning nor smoothing is performed on the target pixel, the pixel value deciding unit 54 temporarily decides the original pixel value C[25] of the target pixel as the pixel value G[25] of the target pixel of when thinning processing and smoothing processing are realized at the same time as shown in FIG. 17 (step S61).

Subsequently, the pixel value deciding unit 54 determines whether three pixels which are the target pixel, the surrounding pixel adjacent to the target pixel in the edge direction pos and the surrounding pixel adjacent to the target pixel in the opposite-edge direction apos have nearly the same pixel values (step S62). This is because the pixel values of the three pixels which are the target pixel and the surrounding pixels adjacent to the target pixel in the edge direction pos and in the opposite-edge direction apos are nearly the same when the target pixel is an inner edge. If both of the value obtained by subtracting the pixel value C[apos] of the surrounding pixel adjacent to the target pixel in the opposite-edge direction apos from the pixel value C[pos] of the surrounding pixel adjacent to the target pixel in the edge direction pos and the value obtained by subtracting the pixel value C[25] of the target pixel from the pixel value C[pos] of the surrounding pixel adjacent to the target pixel in the edge direction pos are smaller than the threshold value Th3, the pixel value deciding unit 54 determines that the pixel values of the three pixels are nearly the same, and if either of the above values exceeds the threshold value Th3, the pixel value deciding unit 54 determines that the pixel values of the three pixels are not nearly the same.

If the pixel values of the three pixels are not nearly the same (step S62; N), the target pixel is not an inner edge but is located more inside than the inner edge, and thus the pixel value deciding unit 54 outputs the pixel value G[25] which was decided in step S61. If the target pixel is located more inside than the inner edge, the surrounding pixel adjacent to the target pixel is also located at the inner edge or more inside than the inner edge and thus it is not appropriate to perform thinning and smoothing on the surrounding pixel. Therefore, the pixel value deciding unit 54 mandatorily modifies the change amount of the surrounding pixel to dST[pos]=dST[apos]=0 (step S63), and invalidates thinning and smoothing.

If the pixel values of the three pixels are nearly the same (step S62;Y), the target pixel is an inner edge. The pixel value deciding unit 54 determines in which direction among the edge direction pos and the opposite-edge direction apos the thinned and smoothed surrounding pixel is adjacent to the target pixel (step S64).

If the edge direction pos, the change amounts dST[pos] and dSMT[pos] which are input with respect to the surrounding pixel adjacent to the target pixel in the edge direction pos meet pos≠0, dST[pos] ≠0 and dSMT[pos] ≠0 (step S64; Y), the pixel value deciding unit 54 determines that the thinned and smoothed surrounding pixel is adjacent to the target pixel in the edge direction pos (step S65).

If the opposite-edge direction apos, the change amounts dST[apos] and dSMT[apos] which are input with respect to the surrounding pixel adjacent to the target pixel in the opposite-edge direction apos meet apos≠0, dST[apos]≠0 and dSMT[apos]≠0 (step S64; N, S66; Y), the pixel value deciding unit 54 determines that the thinned and smoothed surrounding pixel is adjacent to the target pixel in the opposite-edge direction apos (step S67).

If none of the conditions is met (step S66; N), the pixel value deciding unit 54 determines that the thinned and smoothed surrounding pixel is not adjacent to the target pixel in the edge direction nor in the opposite-edge direction, and outputs the pixel value G[25] of the target pixel which was decided in step S61.

If it is specified that the thinned and smoothed surrounding pixel is adjacent to the target pixel in the edge direction pos, the pixel value deciding unit 54 decides the value which is obtained by adding the change amount dST[pos] due to thinning and the change amount dSMT[pos] due to smoothing to the pixel value C[pos] of the surrounding pixel as the pixel value G[pos] of the surrounding pixel of when thinning processing and smoothing processing are realized at the same time (step S68).

It is not natural if the pixel value G[pos] of the surrounding pixel becomes larger than the pixel value of the foreground due to thinning and smoothing. Therefore, if the decided pixel value G[pos] is larger than the pixel value C[2pos] of the surrounding pixel which is two pixels away from the target pixel in the edge direction pos (step S69; Y), the pixel value deciding unit 54 modifies the pixel value G[pos] of the surrounding pixel to the pixel value C[2pos] of the surrounding pixel which is two pixels away from the target pixel. In addition, the pixel value deciding unit 54 decides the value which is obtained by adding the rest of the pixel value G[pos]-C[2pos] which could not be processed in the surrounding pixel to the pixel value C[25] of the target pixel as the pixel value G[25] of the target pixel of when thinning processing and smoothing processing are realized at the same time (step S70).

In order to also keep the decided pixel value G[25] of the target pixel to be equal to or smaller than the pixel value of the foreground, if the decided pixel value G[25] of the target pixel is larger than the pixel value C[2pos] of the surrounding pixel which is two pixels away in the edge direction (step S71;Y), the pixel value deciding unit 54 further modifies the pixel value G[25] of the target pixel to the pixel value C[2pos] of the surrounding pixel which is two pixels away from the target pixel (step S72).

On the other hand, if the thinned and smoothed surrounding pixel is specified to be adjacent to the target pixel in the opposite-edge direction apos, the pixel value deciding unit 54 decides the value which is obtained by adding the change amount dST[apos] due to thinning processing and the change amount dSMT[apos] due to smoothing processing to the pixel value C[apos] of the surrounding pixel as the pixel value G[apos] of the surrounding pixel of when thinning processing and smoothing processing are realized at the same time (step S73).

It is not natural if the pixel value G[apos] of the surrounding pixel becomes smaller than the pixel value of the background due to thinning and smoothing. Therefore, if the decided pixel value G[apos] is smaller than the pixel value C[2apos] of the surrounding pixel which is two pixels away from the target pixel in the opposite-edge direction (step S74; Y), the pixel value deciding unit 54 modifies the pixel value G[apos] of the surrounding pixel to the pixel value C[2apos] of the surrounding pixel which is two pixels away from the target pixel. In addition, the pixel value deciding unit 54 adds the rest of the pixel value G[apos]-C[2apos] which could not be processed in the surrounding pixel to the pixel value C[25] of the target pixel, and decides the obtained value as the pixel value G[25] of the target pixel (step S75).

In order to also keep the decided pixel value G[25] of the target pixel to be equal to or smaller than the pixel value of the background, if the decided pixel value G[25] of the target pixel is smaller than the pixel value C[2apos] of the surrounding pixel which is two pixels away in the opposite-edge direction (step S76; Y), the pixel value deciding unit 54 further modifies the pixel value G[25] of the target pixel to the pixel value C[2apos] of the surrounding pixel which is two pixels away from the target pixel (step S77).

Figure 19A:
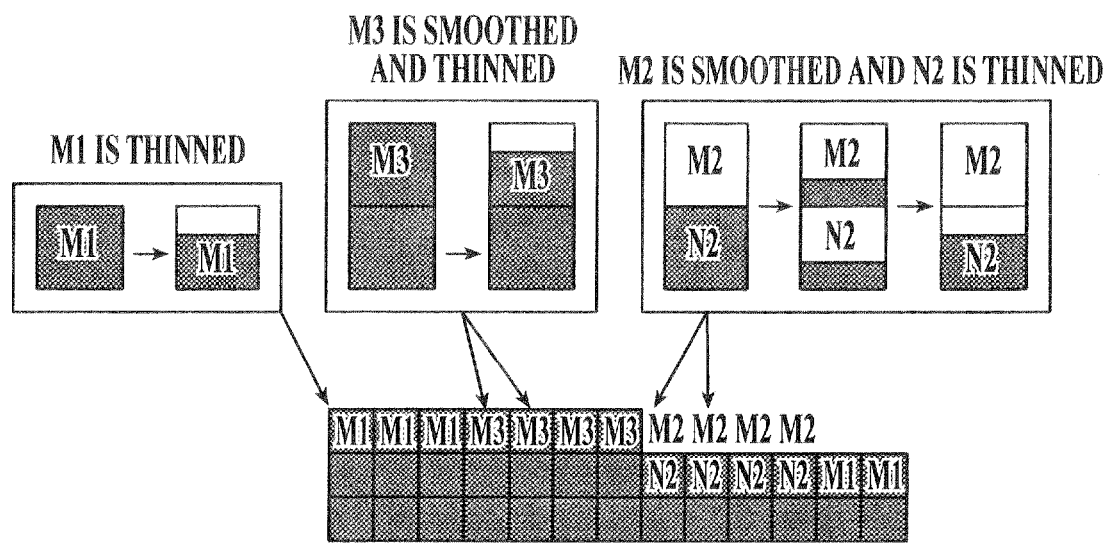
FIG. 19A is an image diagram of processing performed by the blending processing unit.

FIG. 19A is an image diagram of processing which is performed by the blending processing unit 5.

When thinning processing and smoothing processing are performed on the image shown in FIG. 19A, only the thinning is performed on the target pixels M1, and thus this is classified into case 2. Then, the pixel values of the target pixels M1 which are only thinned are output because neither thinning nor smoothing is performed on the surrounding pixels adjacent to the target pixel M1 in the edge direction and in the opposite-edge direction.

On the other hand, the target pixels M2 are smoothed and the surrounding pixels N2 adjacent respectively to the target pixels M2 in the edge direction are thinned. Therefore, this is classified into case 3. In each set of target pixel M2 and surrounding pixel N2, the pixel value obtained by adding the pixel value of the smoothed target pixel M2 and the pixel value of the thinned surrounding pixel N2 is distributed to the target pixel M2 and the surrounding pixel N2 so as to be shifted to the surrounding pixel N2 whose original pixel value is larger.

Both of smoothing and thinning are performed on the target pixels M3, and neither thinning nor smoothing is performed on the surrounding pixels adjacent respectively to the target pixels M3 in the edge direction or in the opposite-edge direction. Such case is classified into case 1, and the pixel values of the thinned and smoothed target pixels M3 are output.

Figure 19B:
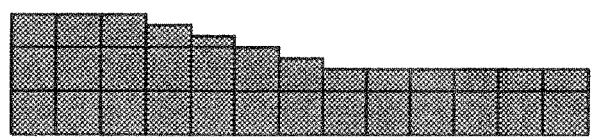
FIG. 19B is a diagram illustrating a processing result of the blending processing unit.

As a result, the straight line is thinned and the oblique line is smoothly stepped by smoothing to realize thinning and smoothing in a well balanced manner as shown in FIG. 19B.

In contrast to such a good processing result obtained by the blending processing unit 5, it is difficult to realize thinning and smoothing at the same time by a method of switching processing depending on the image structure so as to perform thinning processing for a straight line portion and smoothing processing for an oblique line portion and by a method of setting the pixel value which was changed at the time of smoothing processing to be a smaller value considering that thinning processing is to be also performed at the same time.

Figure 20A:
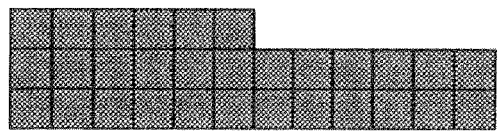
FIG. 20A is a diagram illustrating an original image.
Figure 20B:
FIG. 20B is a diagram illustrating a desired image when thinning processing and smoothing processing are performed at the same time.

FIG. 20A shows an original image. FIG. 20B shows a desired image to be realized when thinning processing and smoothing processing are performed at the same time on the original image.

Figure 20C:
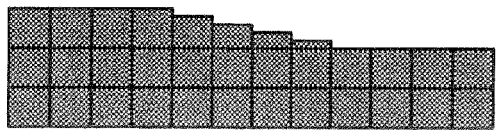
FIG. 20C is a diagram illustrating a processing result when only smoothing processing is performed on the original image.
Figure 20D:
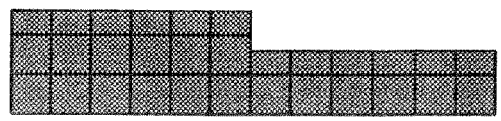
FIG. 20D is a diagram illustrating a processing result when only thinning processing is performed on the original image.

When only the smoothing processing is executed on the original image, pixel values of pixels which are located at the edge of the oblique line portion are increased to obtain a smooth oblique line as shown in FIG. 20C. When only the thinning processing is executed on the original image, pixel values of the straight line portion are decreased and the straight line portion is visually thinned as shown in FIG. 20D.

When both of smoothing processing and thinning processing are performed at the same time, it is expected that the oblique line portion becomes smooth and the pixel values of the edge of the straight line portion is decreased as the desired image shown in FIG. 20B. However, mere switching so as to perform smoothing processing for the oblique line portion and to perform thinning processing for the straight line portion generates unexpected steps at the points indicated by the arrows as shown in FIG. 20E, and thus the smooth oblique line cannot be realized.

Figure 20E:
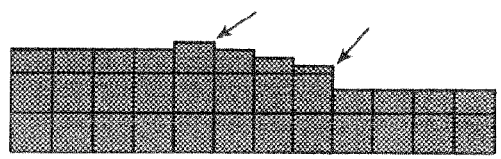
FIG. 20E is a diagram illustrating a processing result when processing is switched between smoothing processing and thinning processing depending on the image structure.
Figure 20F:
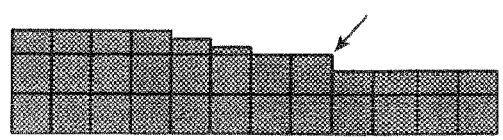
FIG. 20F is a diagram illustrating a processing result when a pixel value is adjusted to be smaller in smoothing processing.

When the pixel value which was changed at the time of smoothing processing is set to be a smaller value considering that thinning processing is to be also performed at the same time, the processing result as shown in FIG. 20F is obtained.

Though the result seems to be improved comparing to the processing result shown in FIG. 20E, a step is generated at the point indicated by the arrow and the image quality is degraded comparing to the desired image and the processing result obtained by the blending processing unit 5 according to the embodiment (see FIG. 19B).

In the abovementioned blending processing which realizes thinning processing and smoothing processing at the same time, when a thinned pixel is isolated, neither thinning nor smoothing is realized and image quality is degraded. Thus, the image processing apparatus 1 includes a thinning adjustment unit 6 as shown in FIG. 1, and the thinning adjustment unit 6 invalidates the thinning to be performed by the thinning processing unit 3 when the thinned pixel is to be isolated The thinning adjustment unit 6 inputs the change amounts dST of a target pixel and surrounding pixels thereof in the blending processing unit 5 from the thinning processing unit 3, and determines whether a thinned pixel among the target pixel and the surrounding pixels thereof is isolated by the input change amounts dST. If the pixel is determined to be isolated, the thinning adjustment unit 6 resets the change amount dST of the thinned pixel among the target pixel and the surrounding pixels to a value of zero, and invalidates the thinning. The thinning adjustment unit 6 executes the invalidation of thinning depending on a control signal SW from the control unit 7.

The control unit 7 outputs the control signal SW to the thinning adjustment unit 6, and switches between execution and non-execution of the invalidation of thinning by the thinning adjustment unit 6. The control unit 7 outputs SW=1 if thinning is to be invalidated, and outputs SW=0 if thinning is not invalidated.

Figure 21:
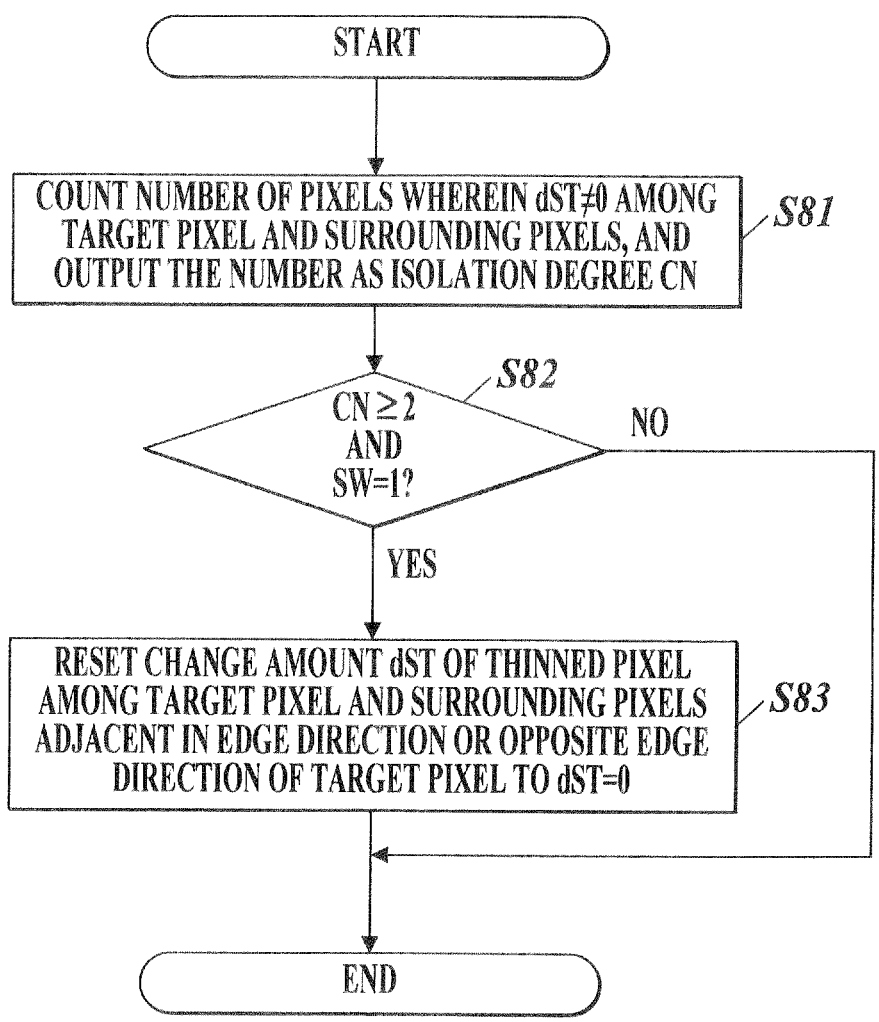
FIG. 21 is a flowchart of processing performed by a thinning adjustment unit.

FIG. 21 is a flowchart of processing which is executed by the thinning adjustment unit 6.

As shown in FIG. 21, the thinning adjustment unit 6 stores the change amounts dST of 1×3 pixels which are output from the three thinning processing units 3 for three pixels in the main scanning direction, and inputs the change amounts dST of 3×3 pixels which are the target pixel of identification number 25 and the surrounding pixels thereof. The thinning adjustment unit 6 counts the number of pixels which are thinned by thinning processing, that is, pixels of dST≠0 among the 3×3 pixels, and outputs the counted number as isolation degree CN (step S81).

If the isolation degree CN, that is, the number of the thinned pixels, is one or two, the thinned pixels are assumed to be isolated among the 3×3 pixels. Hereinafter, an example wherein the thinning adjustment unit 6 determines the thinned pixels are isolated when the isolation degree CN is larger than zero and equal to or smaller than two will be described. However, as the standard for determining the isolation of the thinned pixel, a condition wherein the isolation degree CN is larger than zero and equal to or smaller than one may be used. Even when the determination standard is that the isolation degree CN is equal to or smaller than one, same effect can be obtained as in the case of the determination standard wherein the isolation degree CN is equal to or smaller than two.

If CN≤2 and SW=1 is fulfilled (step S82; Y), the thinning adjustment unit 6 mandatorily resets the change amount dST [25], dST[pos] or dST[apos] in pixel value due to thinning processing of the pixel which is thinned among the target pixel and the surrounding pixels adjacent to the target pixel in the edge direction or in the opposite-edge direction to have a value of zero (step S83). If the thinned pixel is a surrounding pixel which is adjacent to the target pixel in the edge direction pos or in the opposite-edge direction apos, it is preferred that the thinning adjustment unit 6 resets the change amount dST [pos] or dST[apos] of the surrounding pixel on condition that the target pixel is thinned. After the reset, the thinning adjustment unit 6 outputs the change amounts dST in pixel value due to thinning processing of the 3×3 pixels (the target pixel and the surrounding pixels thereof) to the blending processing unit 5.

If CN≤2 and SW=1 is not fulfilled (step S82; N), the thinned pixel is not isolated, or reset of thinning is not set to be executed though the pixel is isolated. In both of the cases, the thinning adjustment unit 6 does not execute the reset of change amount dST, and outputs the change amounts dST due to thinning processing of 3×3 pixels which are input to the blending processing unit 5 without changing them.

The classification unit 50 of the blending processing unit 5 uses the change amounts dST which are output from the thinning adjustment unit 6 and performs classification into the above mentioned cases 1 to 4. If the thinning of the target pixel is invalidated, this is classified into case 3 or case 4. In addition, the pixel value deciding units 51 to 54 also use the change amounts dST which are output from the thinning adjustment unit 6, and decides the pixel value G[25] of the target pixel and the pixel value G[pos] or G[apos] of the surrounding pixel adjacent to the target pixel in the edge direction pos or in the opposite-edge direction apos.

The above invalidation of thinning improves the reproducibility of thin lines.

Figure 22A:
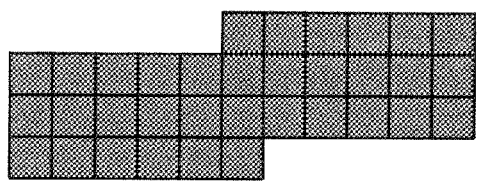
FIG. 22A is an original image.
Figure 22B:
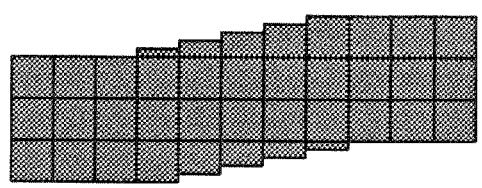
FIG. 22B is an image after smoothing processing is performed on the original image.

For example, when only the smoothing processing is performed on an original image which has an oblique line structure wherein a thin line which has a three-pixel width is arranged in a stepwise manner as shown in FIG. 22A, the image as shown in FIG. 22B is obtained as a processing result. By smoothing processing, the pixel value of each pixel at the step portion is increased or decreased to form a smooth oblique line.

Figure 22C:
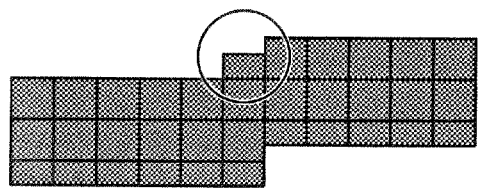
FIG. 22C is an image after thinning processing is performed on the original image.
Figure 22D:
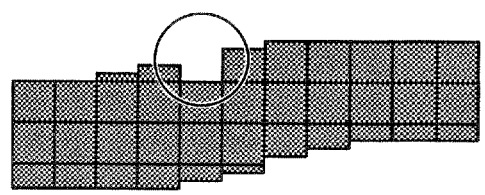
FIG. 22D is an image when thinning processing and smoothing processing are realized at the same time on the original image.

On the other hand, when only the thinning processing is performed on the original image, the image as shown in FIG. 22C is obtained as a processing result. If there is only one pixel which is thinned as shown in FIG. 22C (the encircled pixel in FIG. 22C) and the pixel is isolated, the pixel value is decreased excessively in the isolated thinned pixel as shown with the circle in FIG. 22D when thinning processing and smoothing processing are realized at the same time by the blending processing unit 5, and smoothing cannot be realized.

Figure 22E:
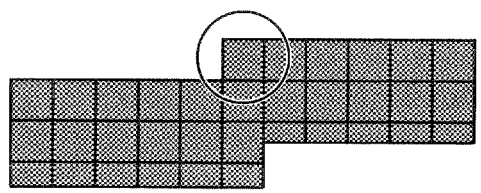
FIG. 22E is an image after thinning processing is performed in a case where the thinning is invalidated with respect to an isolated thinned pixel.
Figure 22F:
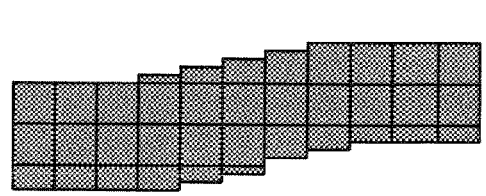
FIG. 22F is an image when thinning processing and smoothing processing are realized at the same time on the original image after the thinning is invalidated.

Thus, when thinning of the isolated thinned pixel is invalidated, the image shown in FIG. 22E is obtained instead of the image shown in FIG. 22C as a processing result of thinning processing. The encircled pixel in FIG. 22E is a pixel whose thinning is invalidated. Thereafter, when thinning processing and smoothing processing are realized at the same time by the blending processing unit 5, the image of a thin line in which thinning and smoothing are both realized is obtained as shown in FIG. 22F.

As mentioned above, according to the embodiment, the image processing apparatus includes a thinning processing unit 3 which performs thinning processing on image data, a smoothing processing unit 2 which performs smoothing processing on image data, an edge direction determination unit 4 which determines an edge direction pos of each pixel of the image data, a blending processing unit 5 which decides a pixel value G[25] of a target pixel when smoothing processing and thinning processing are realized at the same time depending on a combination of whether thinning is performed or not and whether smoothing is performed or not on the target pixel by using each pixel value of the target pixel and surrounding pixels of the target pixel, a change amount dSMT in pixel value due to smoothing processing, a change amount dST in pixel value due to thinning processing and the edge direction pos which is determined with respect to the target pixel, and a thinning adjustment unit 6 which determines whether the thinned pixel becomes isolated or not by the change amounts dST in pixel value due to thinning processing of the target pixel and the surrounding pixels thereof, and if the pixel is determined to be isolated, the thinning adjustment unit 6 resets the change amount dST[25], dST[pos] or dST[apos] in pixel value due to thinning processing of the pixel which is thinned among the target pixel or surrounding pixel adjacent to the target pixel in the edge direction pos or in the opposite-edge direction apos to a value of zero. The blending processing unit 5 uses the change amount dST[25], dST[pos] or dST[apos] in pixel value due to thinning processing which is reset to decide the pixel value G[25] of the target pixel.

In such way, it is possible to prevent degradation in image quality caused by isolation of a thinned pixel when thinning processing and smoothing processing are realized at the same time.

If the thinned pixel is a surrounding pixel adjacent to the target pixel in the edge direction pos or in the opposite-edge direction apos, it is preferred that the thinning adjustment unit 6 resets the change amount dST[pos] or dST[apos] in pixel value due to thinning processing of the surrounding pixel on condition that the target pixel is thinned.

Whether or not to execute the reset of change amount dST can be switched properly because the control unit 7 which switches whether or not to execute the reset by the thinning adjustment unit 6 is provided.

The above described embodiment is a preferred example of the present invention and the present invention shall not be limited to this.

For example, after the blending processing unit 5 classifies the combinations of whether thinning is performed or not and whether smoothing is performed or not on the target pixel into cases 1 to 4, the thinning adjustment unit 6 may reset the change amount dST. In this case, each of the pixel value deciding units 51 to 54 includes a thinning adjustment unit 6, and executes the processing by the thinning adjustment unit 6 shown in FIG. 21 before the processing shown in FIGS. 11, 13, 15 and 17. Thus, in cases 1 and 2, the change amount dST[25] of the target pixel is reset to dST[25]=0. In cases 3 and 4, the change amount dST[pos] of the surrounding pixel adjacent to the target pixel in the edge direction pos or the change amount dST[apos] of the surrounding pixel adjacent to the target pixel in the opposite-edge direction apos is reset to be zero.

In the abovementioned embodiment, the value of the change amount dST is reset to be zero before classification into cases 1 to 4, and thus the resetting affects the classification into cases 1 to 4. In contrast to this, by carrying out the resetting after the classification into cases 1 to 4, it is possible to perform the classification into cases 1 to 4 by using the value of original change amount dST and to use the value of the change amount dST which is reset only when the blending processing unit 5 performs calculation of the pixel value.

In addition, the processing method of thinning processing and smoothing processing shall not be limited to the above-mentioned processing method. Any processing method may be used as long as change amounts in pixel value due to thinning processing and change amounts in pixel value due to smoothing processing are output.

Although the change amounts dST and dSMT used by the blending processing unit 5 are respectively calculated by the thinning processing unit 3 and the smoothing processing unit 2 in the embodiment, the smoothing processing unit 2 and the thinning processing unit 3 may output pixel values after the processing, and the blending processing unit 5 may calculate the change amounts dST and dSMT by subtracting the original pixel value from the pixel values after the processing.

Also, the processing contents of each unit such as the blending processing unit 5 and the thinning adjustment unit 6 may be programmed and software processing may be performed by cooperation between such program and CPU and the like. Then, as a computer readable medium of the program, a non-volatile memory such as ROM and a flash memory and a portable record medium such as CD-ROM can be used. Also, as a medium for providing program data via a communication line, carrier wave is also used in the present invention.

According to one aspect of the present invention, the image processing apparatus includes a thinning processing unit which performs thinning processing on image data, a smoothing processing unit which performs smoothing processing on the image data, an edge direction determination unit which determines an edge direction with respect to each pixel of the image data, a blending processing unit which decides a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, and a thinning adjustment unit which determines whether a thinned pixel becomes isolated by change amounts in pixel value due to the thinning processing of the target pixel and the surrounding pixel, the thinning adjustment unit resetting the change amount in pixel value due to the thinning processing of the thinned pixel among the target pixel and the surrounding pixel adjacent to the target pixel in the edge direction or in an opposite-edge direction to a value of zero if the thinned pixel is determined to be isolated, and the blending processing unit uses the reset change amount in pixel value due to the thinning processing to decide the pixel value of the target pixel.

According to the present invention, it is possible to invalidate thinning to be performed on the isolated thinned pixel when a pixel value of when thinning processing and smoothing processing are realized at the same time is decided. By the invalidation of thinning, degradation of image quality caused by the thinning can be avoided.

Preferably, when the thinned pixel is a surrounding pixel adjacent in the edge direction or in the opposite-edge direction of the target pixel, the thinning adjustment unit resets the change amount in pixel value due to thinning processing of the surrounding pixel to a value of zero on condition that the target pixel is thinned.

Preferably, the thinning adjustment unit performs the reset after the blending processing unit classifies the combination of presence or absence of thinning and presence or absence of smoothing on the target pixel by the change amount in pixel value due to the thinning processing and the change amount in pixel value due to the smoothing processing of the target pixel.

Preferably, the apparatus includes a control unit which switches whether or not to execute the reset by the thinning adjustment unit.

According to the other aspect of the present invention, the image processing method includes thinning of image data, smoothing of the image data, determining an edge direction with respect to each pixel of the image data, deciding a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, and determining whether a thinned pixel becomes isolated by change amounts in pixel value due to the thinning processing of the target pixel and the surrounding pixel thereof, resetting the change amount in pixel value due to the thinning processing of the thinned pixel among the target pixel and the surrounding pixel adjacent in the edge direction or in the opposite-edge direction of the target pixel to a value of zero if the thinned pixel is determined to be isolated, and in the deciding, the reset change amount in pixel value due to the thinning processing is used to decide the pixel value of the target pixel.

According to the present invention, it is possible to invalidate thinning to be performed on the isolated thinned pixel when a pixel value of when thinning processing and smoothing processing are realized at the same time is decided. By the invalidation of thinning, degradation of image quality caused by the thinning can be avoided.

Preferably, when the thinned pixel is a surrounding pixel adjacent in the edge direction or in the opposite-edge direction of the target pixel, the reset step resets the change amount in pixel value due to thinning processing of the surrounding pixel to a value of zero on condition that the target pixel is thinned.

Preferably, the reset step performs the reset after the decision step classifies the combination of presence or absence of thinning and presence or absence of smoothing on the target pixel by the change amount in pixel value due to the thinning processing and the change amount in pixel value due to the smoothing processing of the target pixel.

Preferably, the method includes a control step which switches whether or not to execute the reset by the reset step.

The entire disclosure of Japanese Patent Application No. 2011-143684 filed on Jun. 29, 2011 including description, claims, drawings, and abstract are incorporated herein by reference in its entirety.

What is claimed is:
1. An image processing apparatus, comprising:
a thinning processing unit which performs thinning processing on image data;
a smoothing processing unit which performs smoothing processing on the image data;
an edge direction determination unit which determines an edge direction with respect to each pixel of the image data;
a blending processing unit which decides a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel; and a thinning adjustment unit which determines whether a thinned pixel becomes isolated by change amounts in pixel value due to the thinning processing of the target pixel and the surrounding pixel, the thinning adjustment unit resetting the change amount in pixel value due to the thinning processing of the thinned pixel among the target pixel and the surrounding pixel adjacent to the target pixel in the edge direction or in an opposite-edge direction to a value of zero if the thinned pixel is determined to be isolated and wherein the blending processing unit uses the reset change amount in pixel value due to the thinning processing to decide the pixel value of the target pixel.

2. The image processing apparatus according to claim 1, wherein the thinning adjustment unit resets the change amount in pixel value due to the thinning processing of the surrounding pixel to a value of zero on condition that the target pixel is thinned when the thinned pixel is the surrounding pixel adjacent to the target pixel in the edge direction or in the opposite-edge direction.

3. The image processing apparatus according to claim 1, wherein the thinning adjustment unit performs the resetting after the blending processing unit classifies the combination of whether thinning processing is performed or not and whether smoothing processing is performed or not on the target pixel by using the change amount in pixel value due to the thinning processing and the change amount in pixel value due to the smoothing processing of the target pixel.

4. The image processing apparatus according to claim 1, further comprising:
   a control unit which switches between execution and not-execution of the resetting by the thinning adjustment unit.

5. An image processing method, comprising:
   thinning of image data;
   smoothing of the image data;
   determining an edge direction with respect to each pixel of the image data;
   deciding a pixel value of a target pixel of when the smoothing processing and the thinning processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel; and determining whether a thinned pixel becomes isolated by change amounts in pixel value due to the thinning processing of the target pixel and the surrounding pixel thereof, resetting the change amount in pixel value due to the thinning processing of the thinned pixel among the target pixel and the surrounding pixel adjacent in the edge direction or in the opposite-edge direction of the target pixel to a value of zero if the thinned pixel is determined to be isolated, and wherein in the deciding, the reset change amount in pixel value due to the thinning processing is used to decide the pixel value of the target pixel.

6. The image processing method according to claim 5, wherein in the resetting, the change amount in pixel value due to the thinning processing of the surrounding pixel is reset to a value of zero on condition that the target pixel is thinned when the thinned pixel is the surrounding pixel adjacent to the target pixel in the edge direction or in the opposite-edge direction.

7. The image processing method according to claim 5, wherein the resetting is performed after the combination of whether thinning processing is performed or not and whether smoothing processing is performed or not on the target pixel is classified by the change amount in pixel value due to the thinning processing and the change amount in pixel value due to the smoothing processing of the target pixel.

8. The image processing method according to claim 5, further comprising:
   controlling so as to switch between execution and not-execution of the resetting.

\* \* \* \* \*